Aug. 9, 1955   N. F. BROWN   2,714,855
APPARATUS FOR GAS LIFT OF LIQUID IN WELLS
Filed May 1, 1952   8 Sheets-Sheet 1
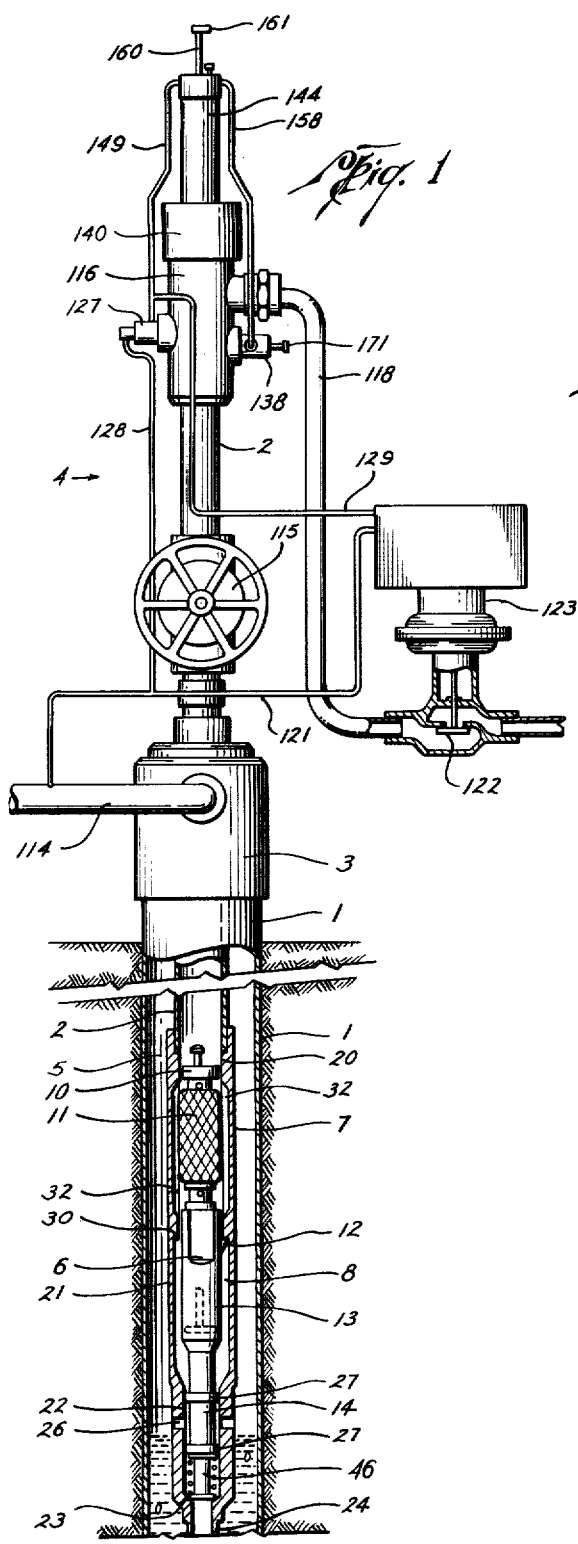
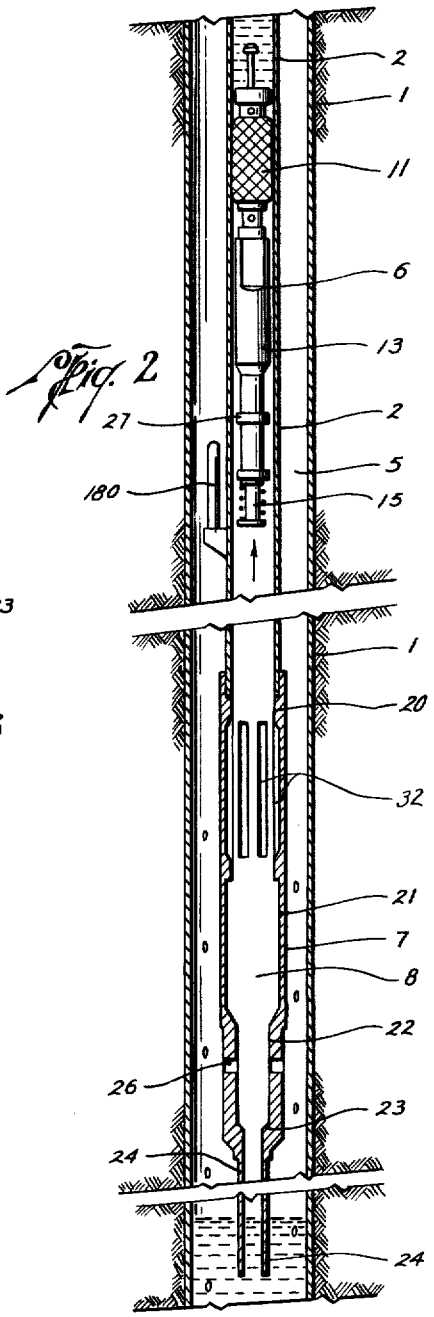
Norman F. Brown
INVENTOR.
BY Thomas O Arnold
ATTORNEY

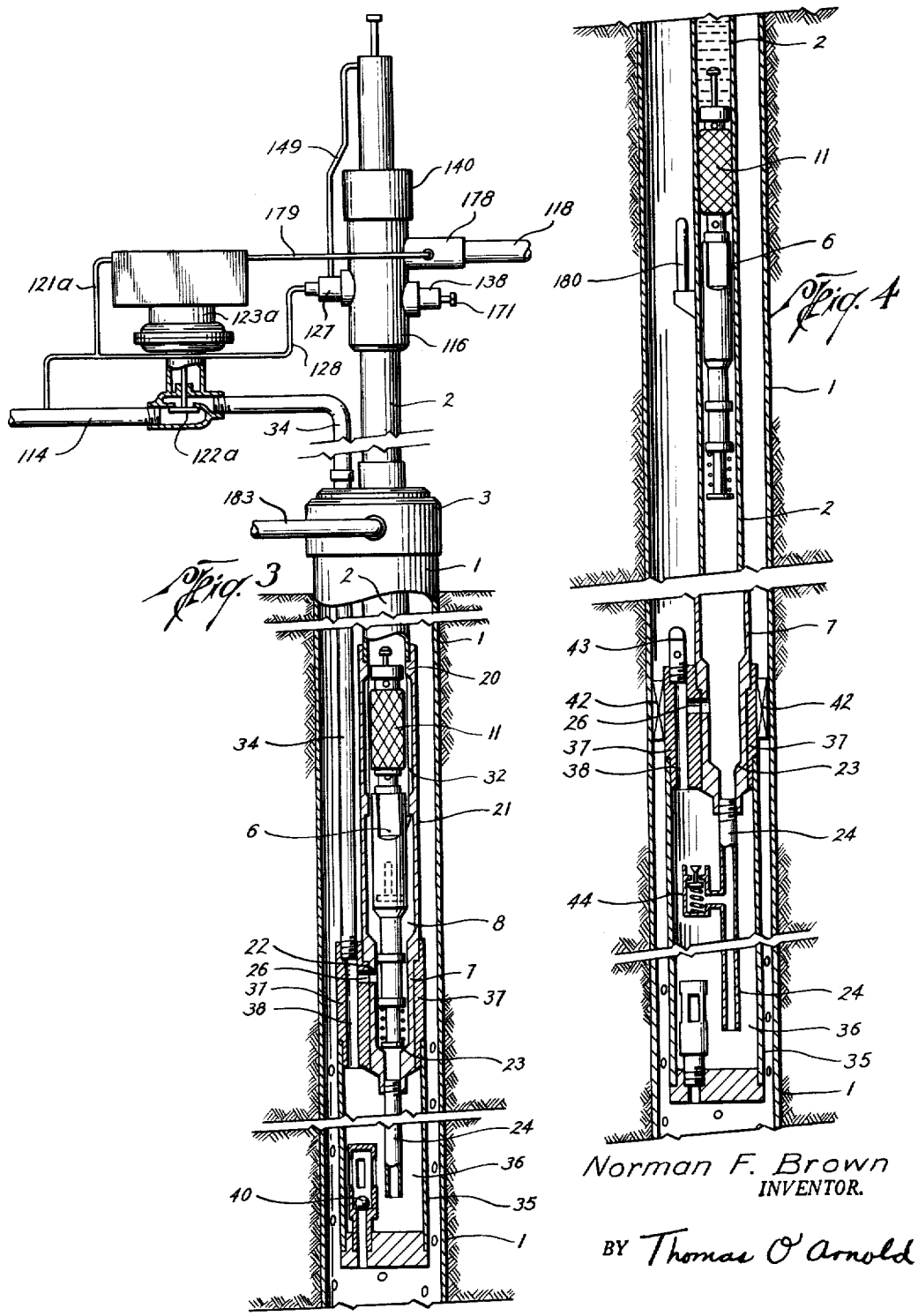

Aug. 9, 1955 N. F. BROWN 2,714,855
APPARATUS FOR GAS LIFT OF LIQUID IN WELLS
Filed May 1, 1952 8 Sheets-Sheet 3
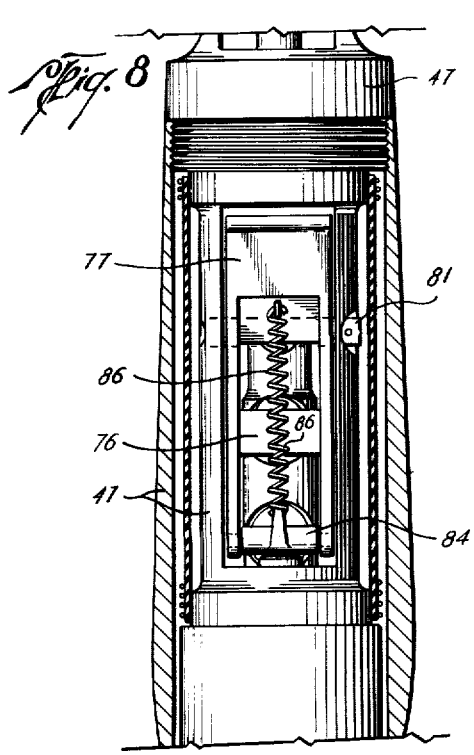
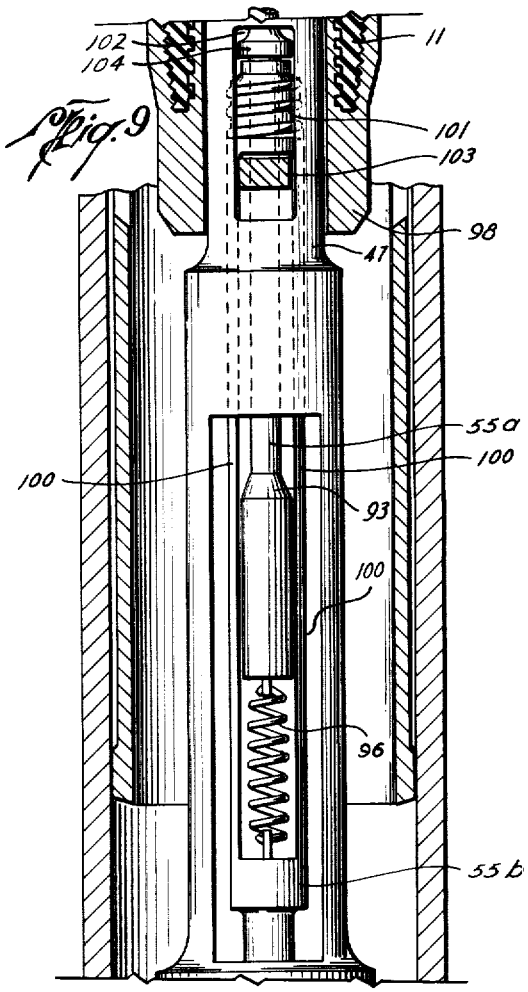
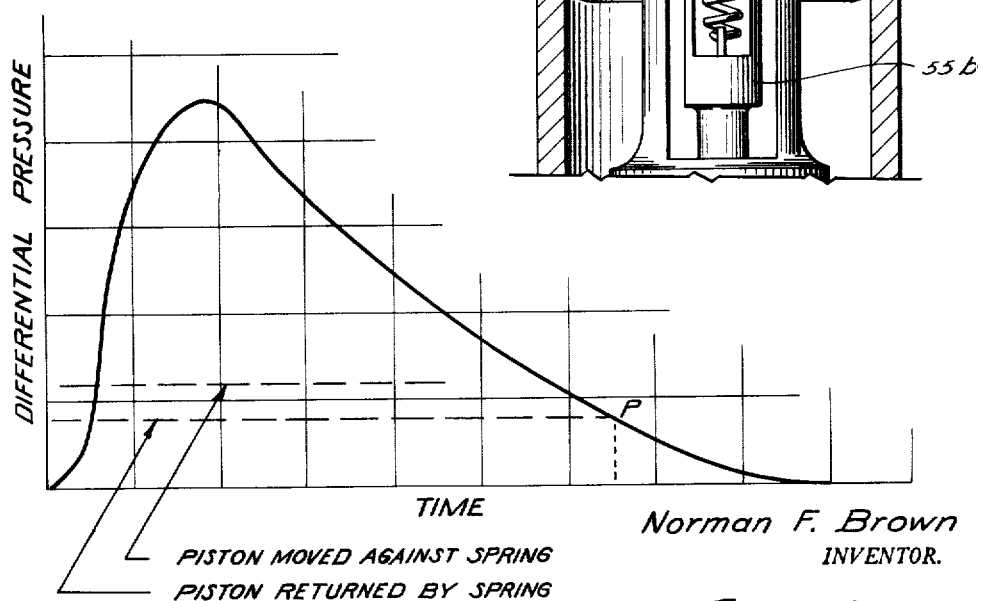
Norman F. Brown
INVENTOR.
BY Thomas O. Arnold
ATTORNEY

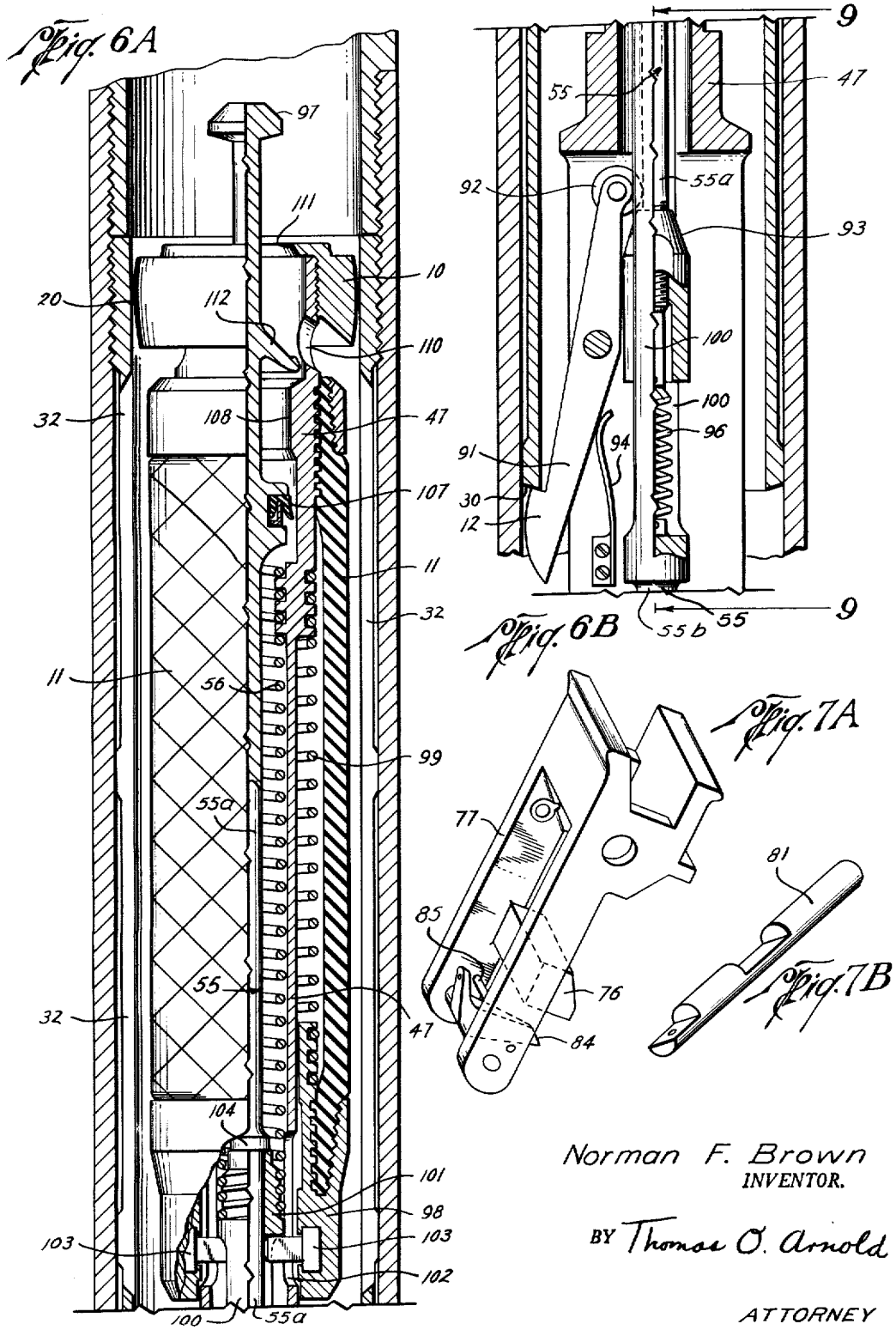

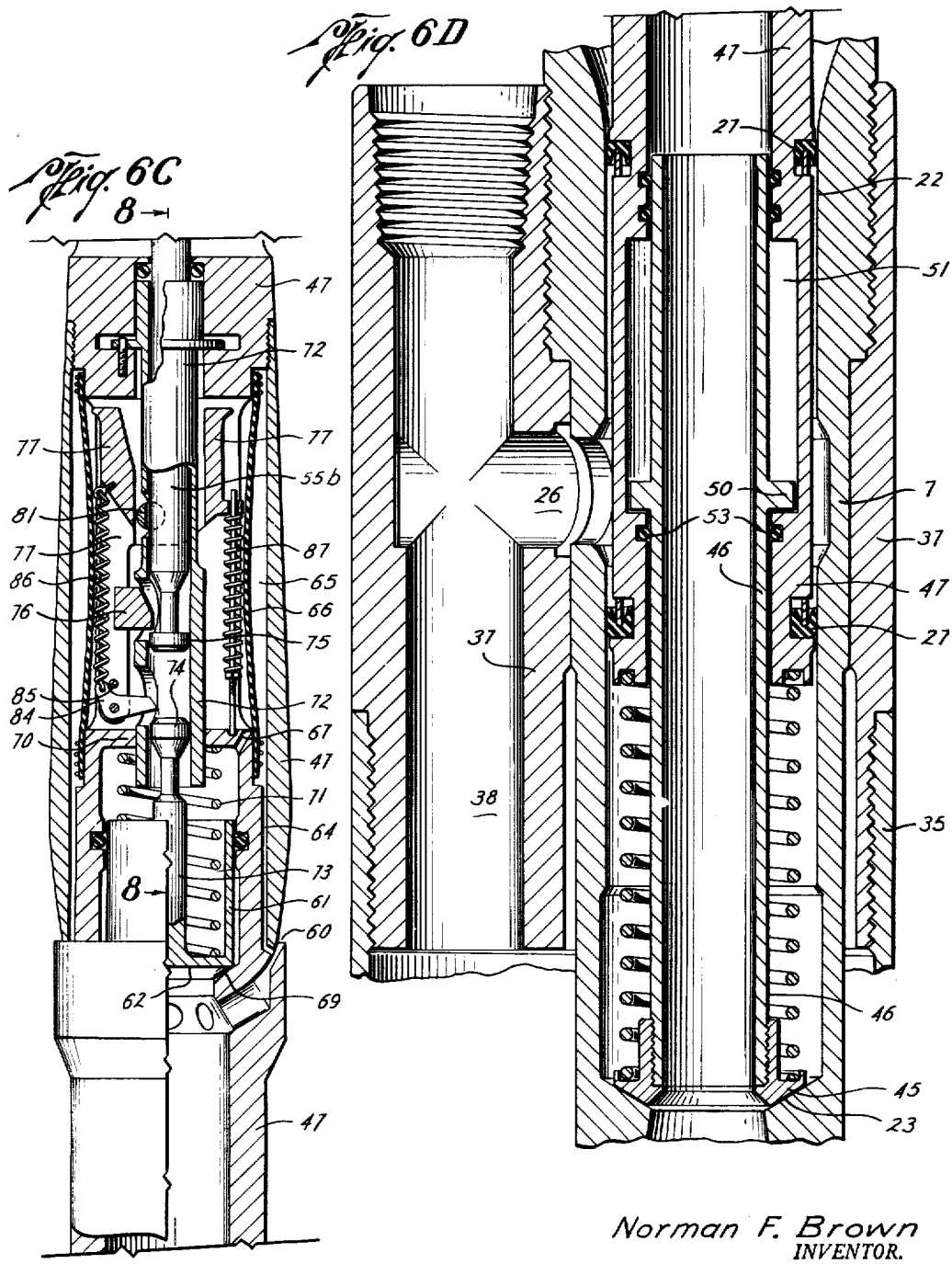

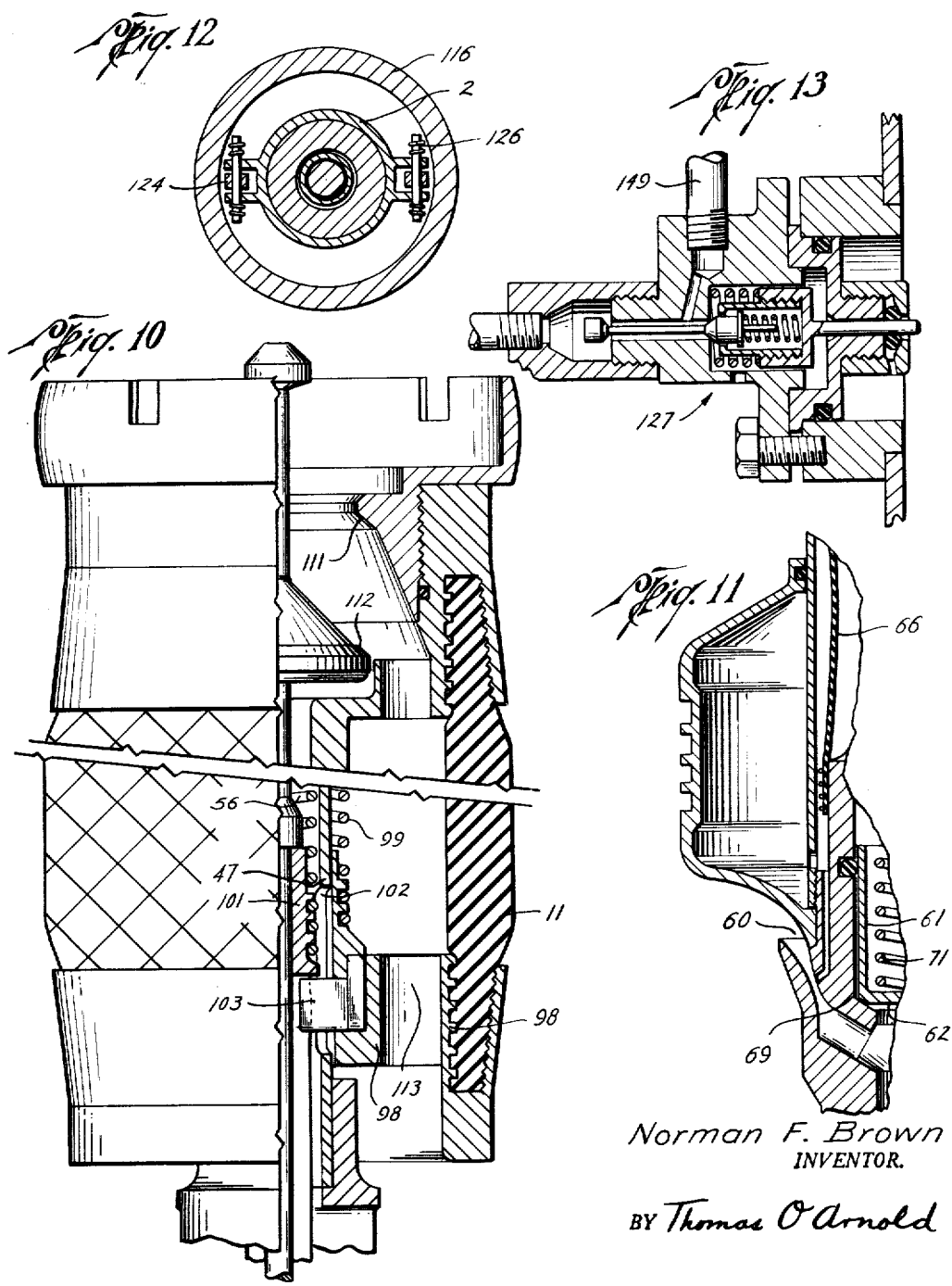

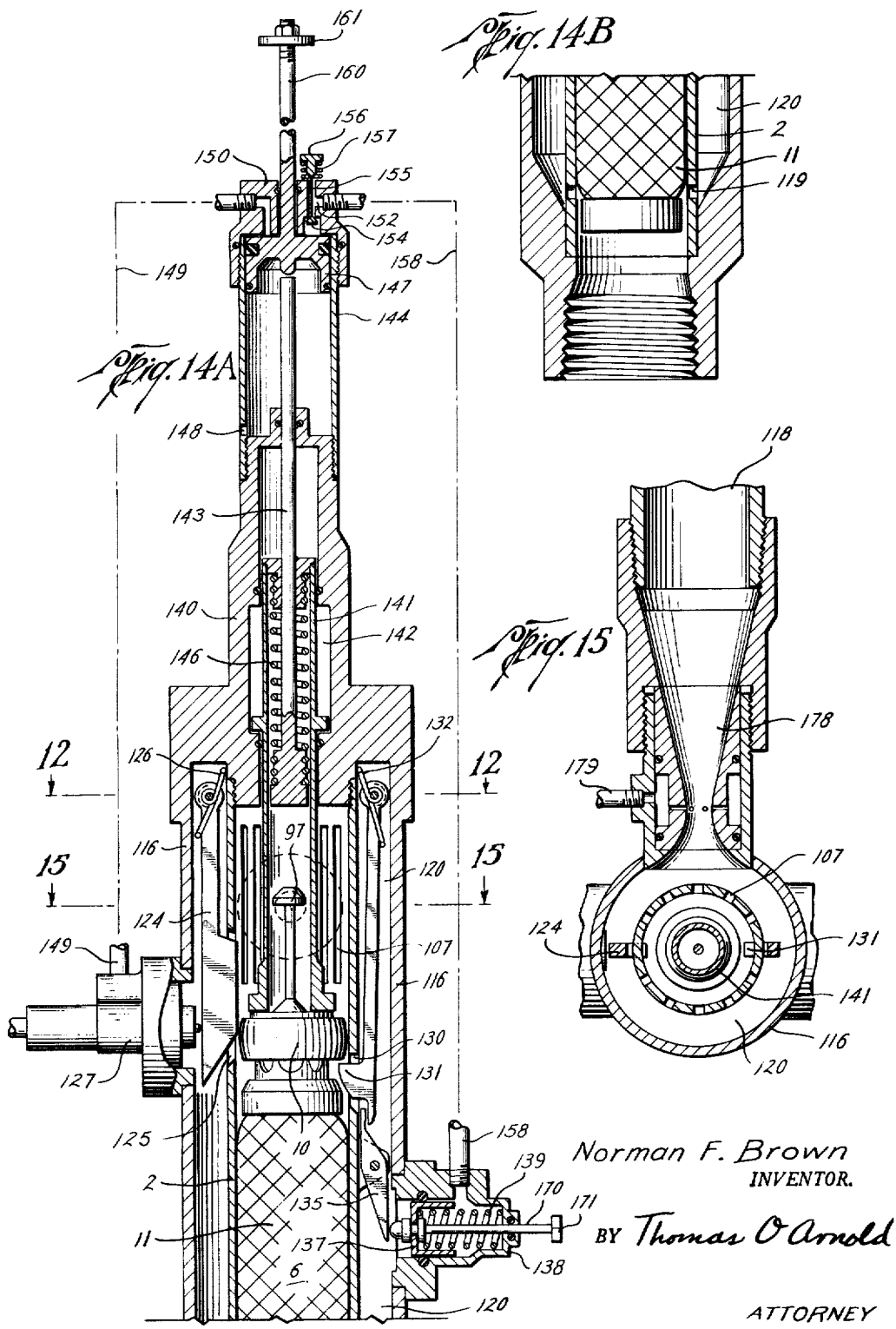

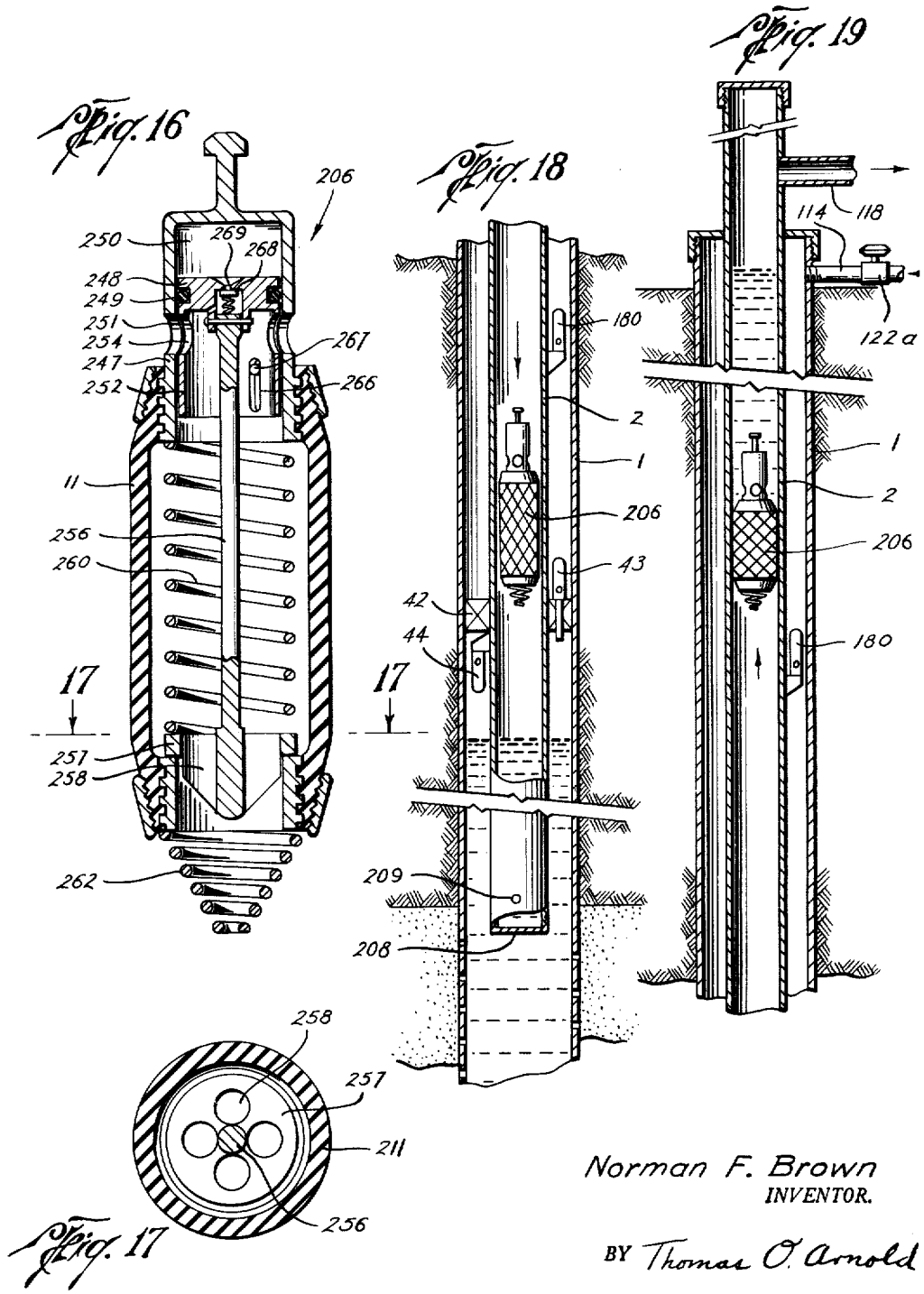

United States Patent Office 2,714,855
Patented Aug. 9, 1955

2,714,855

APPARATUS FOR GAS LIFT OF LIQUID IN WELLS

Norman Fraser Brown, London, England, assignor to N. F. B. Displacement Co., Ltd.

Application May 1, 1952, Serial No. 285,435

39 Claims. (Cl. 103—52)

This invention relates to improvements in free pistons and associated apparatus for raising natural oil and other liquid in wells whereby a column of liquid may be lifted up an eduction pipe or production tubing to the well surface by gas pressure.

In particular, this application is for improvements in the invention disclosed in my United States Patent No. 2,555,112.

The present invention will be described with reference to oil lifted by "gas," but it is understood that the invention is equally applicable to the production of other liquids by gaseous fluids, such as air for example, as well as for the production of oil by natural gas under pressure.

It is common practice in the oil production industry to raise oil to the surface of non-flowing wells by what is known as gas lift. One method of gas lift now known, and disclosed in my said patent, includes the provision of a floating plunger or free piston adapted to be positioned at the lower end of production tubing while oil passes by the free piston to build up a column or slug of oil in that tubing above the free piston. The free piston is adapted to rise vertically in the tubing under force of gas pressure, pushing the slug of oil ahead of it and isolating the base of the oil slug from the gas which lifts it. The free piston falls by gravity down the pipe when the slug has been delivered to the surface.

According to one embodiment of the invention disclosed in my said patent the free piston is equipped with means for automatically securing itself at the lower limit of its downward travel and with means responsive to a variation in the pressure differential created across an orifice by fluids flowing therethrough for effecting the release of said securing means. Also according to that invention the free piston includes an expansible packer which effects the sealing of the piston to the tubing walls during the upward, pumping or power stroke, but which is retracted so as to avoid any such sealing contact with the tubing walls during the descending or return stroke.

An object of this invention is to provide an improved means of obtaining a pressure differential to which the free piston is responsive.

Another object of this invention is to provide improved means for moving the oil to a position in the production tubing above the free piston.

Still another object of this invention is to provide improved means for starting the ascending stroke of the free piston.

A further object is to provide improved means for receiving at the surface, reloading and releasing the free piston.

Still another object is to provide an improve version of the "formation shielded" embodiment.

Yet another object is to provide improved surface controls.

Still a further object is to provide a greatly simplified version of the invention.

Other objects will be apparent from the following description and accompanying drawings wherein:

Figure 1 is a diagrammatic representation of one embodiment of the invention wherein the production formation is not shielded from the working gas pressure, showing the surface equipment together with a diagrammatic sectional view of the bottom hole equipment with a free piston positioned in its socket at the bottom.

Figure 2 is a diagrammatic view of the same embodiment showing various sections of the well and the piston rising therein, Figure 3 is a diagrammatic representation corresponding to Figure 1, but showing a second embodiment of the invention, wherein the producing formation is shielded from the working gas pressure.

Figure 4 is a diagrammatic view of a special modification of the embodiment shown in Figure 3.

Figure 5 is a graph of a pressure differential curve which is characteristic of pressure differentials used in the operation of this invention.

Figures 6A, 6B, 6C and 6D constitute a diagrammatic section of the free piston divided into four views.

Figure 7A is a pictorial view of the free piston trigger.

Figure 7B is a pictorial view of the free piston trigger pivot.

Figure 8 is a diagrammatic side elevational section, taken along the line 8—8 in Figure 6C.

Figure 9 is a side elevational section, taken along the line 9—9 in Figure 6B.

Figure 10 is a diagrammatic view of a free piston packer of large size.

Figure 11 illustrates a particular version of a falling velocity restrictor ring for a large size free piston.

Figure 12 is a section taken along line 12—12 in Figure 14.

Figure 13 is a detail of the pilot valve used in the surface equipment.

Figures 14A and 14B constitute a diagrammatic elevational section of the surface equipment which is a part of the invention.

Figure 15 is a section taken along line 15—15 in Figure 14A, illustrating a surface venturi used in one embodiment of the invention.

Figure 16 is a diagrammatic elevational section of a simplified embodiment of a free piston.

Figure 17 is a section taken along line 17—17 in Figure 16.

Figure 18 is a diagrammatic elevational section of the simplified free piston during its downward stroke, showing also the simplified subsurface well equipment.

Figure 19 is a diagrammatic elevational section of the simplified free piston during its pumping stroke, showing also the simplified surface equipment.

In one preferred embodiment of the invention for use in wells wherein the bottom hole pressure of the well is sufficiently high that oil will flow into the well against the pressure to be used in the gas lift process, the well equipment, both surface equipment and hole equipment, as shown in Figures 1 and 2 may be used.

The well may be equipped with a casing 1 which extends from the surface to the bottom of the well. Within the casing 1 is an eduction pipe or production tube 2. Both the casing 1 and the eduction pipe 2 are secured to a casing head 3 which is the base of the surface equipment assembly 4 to be described later.

Between the casing 1 and the production tubing 2 there is an annular space 5 through which gas may be passed under pressure from the surface to the bottom of the well or, if the well produces excess gas, through which excess gas may be taken from the well. The production tubing 2 constitutes the passage for the upward movement of a free piston 6 with oil above it, and it is therefore connected to the surface assembly 4 which receives the piston 6 after the oil has passed through the surface assembly 4 to a surface pipe line or storage tank (not shown). As a part of the surface equipment, there is a discharge valve 122 in a surface flow line 118 which connects with the pipe line.

At the lower end of the production tubing 2 a socket 7, which defines a socket chamber 8, is provided to receive the piston 6 at the lower extremity of its travel as indicated in Figure 1. The various features of the socket 7 are constructed to cooperate with features of the free piston 6 which will be described in detail later.

Briefly, however, a preferred embodiment of the free piston 6 as illustrated schematically in Figure 1 may be described as comprising in order from the upper end to the lower end as shown, a starting piston 10, an expansible packer 11, a hold-down latch 12, a trigger mechanism unit 13, and a shock absorber assembly 14.

The socket 7 may be briefly described as a cylindrical member secured at the top thereof to the lower end of the production tubing 2, and having three sections hereafter referred to as the upper bore 20, middle bore 21 and lower bore 22, and an abutment 23 in the lower end thereof. Secured to the abutment 23 is the upper end of a length of a bottom tube 24, which extends significantly below the level to which oil will rise in the well. This bottom tube 24 is the conduit for oil rising from the well into and through the socket 7 to build up a column in the production tubing above the free piston 6. The bottom tube 24, the socket 7 and the production tube 2 are seen to define the production path within the well and the bottom tube 24 and socket 7 constitute conduit means through which oil passes in route to the production tube 2.

The normal pumping cycle of the embodiment illustrated in Figure 1 comprises 4 phases. Assuming the free piston 6 to be held at the surface, the casing and tubing both full of gas at working pressure, and the surface flow line valve 122 closed, the first phase commences with the dropping of the free piston 6 which falls by gravity until it reaches the socket 7. The shock absorber hits the abutment 23 and absorbs the impact due to the rapid deceleration of the free piston 6. The shock absorber permits a slight overtravel of the free piston 6, then urges it back upward until the hold-down latch 12 engages a shoulder in the socket to position the free piston 6 in the exact desired position. During the fall of the free piston 6 down the tubing the packer 11 is retracted and makes no substantial contact with the tubing walls.

After the free piston 6 has been latched into the socket the second phase of the cycle begins with the opening of the valve 122 in the surface flow line 118 whereupon the gas contents of the tubing string are rapidly exhausted down to low pressure establishing a pressure differential between the annular space 5 and the production tubing 2. This pressure differential operates to force the oil, which has accumulated in the casing, upward through the bottom tube 24, into and through the shock absorber 14 of the free piston, thence out of the free piston 6 into the socket chamber 8 in the bore 21 in a manner that will be described hereinafter, thence upward on the outside of the trigger unit 13 and the packer 11, thence inside and through the starting piston 10 into the production tubing, whereby a column of oil is built up in said production tubing above the free piston.

When the proper slug of oil has been built up, the latch 12 is withdrawn, the packer 11 is expanded and the passage through the starting piston 10 is closed, all in a manner to be described, and the third phase of the cycle, namely the pumping or power stroke, begins. The free piston 6, driven by the gas pressure beneath it rises to the surface carrying the slug of oil ahead of it. The oil is discharged into a storage tank or pipe line at the surface and the free piston is caught in the surface apparatus 4, whereupon the flow valve 122 is reclosed.

The fourth phase comprises the resetting or reloading of the free piston as hereafter described in preparation for the commencement of the first phase again.

It will be observed that a column of oil exists in the bottom tube 24 at the commencement of the third phase of the cycle wherein the piston rises up the production tubing lifting the production slug ahead of it. Means are provided whereby the gas pressure difference required to support the liquid column in bottom tube 24 prior to the upward movement of the free piston 6 is added, immediately after the free piston 6 has been lifted, to the initial gas pressure which lifts the free piston 6. This may take the form of a by-pass hole 26 in the wall of the lower bore 22 through which gas may pass from the annular chamber 5 into the socket 7 immediately after the free piston 6 commences its upward rise.

Means are also provided to prevent fluid passage through said by-pass hole 26 when the free piston 6 is in its socket. This may take the form of a pair of sealing rings 27 positioned on the free piston 6, one just above and the other just below the by-pass hole 26 when the free piston 6 is in its socket. Alternative embodiments, such as the positioning of the seals 27 on the interior wall of the lower bore 22 instead of on the free piston 6, will appear to those skilled in the art.

The middle bore 21 is preferably somewhat greater than the bore of the production tubing 2 so that an annular space of substantial size to permit easy flow of fluids is formed around the free piston 6. That portion of the free piston 6 which is opposite the lower end of the upper bore 20 is sufficiently small to allow a passage for oil, as best seen in Figure 9.

A shoulder 30 or similar means may be provided in the socket 7 to interact with the latch head 12 to hold the free piston in the socket 7. The shoulder may take the form of the lower edge of the upper bore 20 which, in the illustrated embodiment extends from the latch head 12 to the upper end of the socket 7, so as to surround both the expansible packer 11 and the starter piston 10.

The diameter of the upper bore 20 is preferably slightly smaller than the diameter of the production tubing 2 so that a reasonably close fit is obtained around the outside of the starting piston 10 when the free piston is in the socket 7, while at the same time the starting piston 10 may be small enough to move freely and without interference up and down the production tubing 2, functioning otherwise as a guide for the free piston 6 during its fall.

Convenient means may be provided for permitting easy and rapid flow of fluids around the packer 11 during the time the column of oil is being built up in the production tubing 2.

According to this invention this function is accomplished without the need for retracting the packer 11 except to the slight degree it is retracted to permit easy falling in the production tubing. Slots 32 are cut in the wall of the upper bore 20. The slots extend from just below the starting piston 10 and above the packer 11 to a point below the packer. The slots 32 may end just below the lower end of the packer 11, but if proper latch means are used, the slots 32 may extend all the way down to the middle bore 21, thereby providing additional space for fluid passage by the free piston body. Alternatively, such means as by-pass pipes properly positioned might be used in place of the slots 32. In large models of the free piston by-pass means may take the form of a passage 113 within the packer itself as illustrated in Figure 10.

Further in accordance with this invention means are provided for terminating the flow of fluids past the free piston 6 when the upward stroke is to begin. In prior devices this was accomplished by the expansion of the packer 11 which was surrounded by a smooth bore, and through which there was no passage. In accordance with this invention various difficulties inherent in the prior art structure are avoided by the use of the slots 32, and the starting piston 10 is provided to assume the function of a lift-starter. As will be described in more detail below, a valve within the starting piston closes when the upward stroke is to begin, whereby fluids may no longer pass therethrough. Since the starting piston 10 fits the walls of the upper bore 20 reasonably closely, there is only insignificant leakage around the starting piston when the valve therein is closed until after the starting piston rises into the production tubing 2. By the time the starting piston 10 has risen into the production tubing 2, the expansible packer 11 has risen above the slots 32 and forms a sliding seal first with the wall of the upper bore 20 and subsequently with the production tubing 2, thereby forming a substantially impermeable plug in the tubing 2. Neither gas nor liquids may pass the free piston 6, and the gas pressure thereunder will lift the free piston 6 and the oil thereabove up the production tubing 2 substantially without any loss from the column of oil.

The foregoing embodiment of the invention is adaptable to wells with a high bottom hole pressure, but is not well adapted to wells with very low bottom hole pressure. Therefore, alternative embodiments are provided wherein the oil sand or producing formation is shielded from the pressures used for lifting the oil. One such alternative embodiment is illustrated in Figure 3, and another in Figure 4.

The structure and the fundamental cycle of operation, insofar as it has been previously described, is unchanged. However, additional means are provided to shield the producing formation from the operating gas pressures. This may take the form of a gas input pipe 34 (Figure 3) extending down the well from the surface together with a bottom cylinder 35 which defines a displacement or bottom chamber 36 around the bottom tube 24.

Means are provided for securing the gas input pipe 34, the socket 7 and the bottom cylinder 35 together whereby gas may flow from the gas input pipe 34 into the displacement chamber 36 and/or through the by-pass 26. This may conveniently take the form of an externally cylindrical piece, hereafter termed a collar 37, the lower end of which is screwed into the upper end of the bottom cylinder 35 (Figures 3 and 6D). The lower end of the gas input pipe 34 is secured in the top of said collar 37 and is connected by a passage 38, axial of said collar, to the displacement chamber 36. The lower end of the socket 7 fits into a second and somewhat larger axial hole in the collar 37. The by-pass 26 connects the passage 38 with the lower bore 22 of the socket 7. Gas may therefore flow from the gas input pipe 34 into the lower chamber 36 and into the socket 7 through the by-pass 26 when the free piston 6 is not in the socket 7.

Means are also provided for the admission of oil into the displacement chamber 36 from the lower end of the well in the producing formation in the form of a ball check valve 40 positioned near the lower extremity of the bottom cylinder 35 but preferably above the lower end of the bottom tubing 24. Note that the check valve 40 is the only moving part which is positioned permanently at the bottom of the well.

In the operation of the embodiment illustrated in Figure 3, the free piston 6 is first dropped and locked in the socket 7 as previously described. Gas, under pressure, is then admitted at the surface into the gas input pipe 34. Since the free piston 6 is in the socket 7, the gas cannot flow through the by-pass 26 and it therefore passes on into the displacement chamber 36 where it exerts force on the top of any oil which has come into the displacement chamber 36 through the check valve 40 during the time when gas pressure therein was low. The increased pressure in the displacement chamber 36 closes the check valve 40 and causes the oil to move up bottom tube 24, up into the free piston 6, out of the free piston into the bore 21 in a manner to be described hereafter, and on up past the packer 11 into the production tubing 2. The cycle substantially as previously described takes place. The working gas pressure, however, is not imposed on the producing formation.

Alternatively the input gas may be transmitted to the collar 37 through the casing 1, without the use of the special input gas pipe 34. The input gas is shielded from the producing formation by a packer 42 which seals the annular space between the collar 37 and the casing, as illustrated in Figure 4. As will be seen later, a cycle which is more efficient in its use of gas can be obtained with this embodiment by placing a valve 43 at the top of the passage 38. The valve 43 may open when the absolute pressure above it exceeds a predetermined pressure; the valve 43 may close automatically when the absolute pressure above the valve drops to a predetermined value or when the difference between the pressure above and the pressure below reaches a predetermined difference.

When the packer 42 and the valve 43 are used, a gas trap could be formed in the top of the bottom chamber 36 if the free piston reached and closed the by-pass 26 before the bottom chamber 36 were refilled. Gas so trapped could prevent oil from entering the bottom chamber. Means are therefore provided for bleeding this gas from the top of the bottom chamber 36 into the bottom tube 24 in the form of a bleeder valve 44 which is affixed near the top of the bottom tube 24. The bleeder valve 44 will normally be held open by a light spring when the pressure differential between the chamber 36 and the bottom tube 24 is low; however, when the said pressure differential becomes large, as when working gas pressure is being admitted to the lower chamber, then the bleeder valve 44 closes automatically.

In some wells it may be found that the producing formation will stand operating pressure periodically and the embodiments of the invention shown in Figures 3 and 4 may be used without the bottom cylinder 35. If the bottom cylinder 35 is omitted the lower end of the well serves as the displacement chamber. The producing formation therefore has the working pressure impressed upon it during the pumping portion of the cycle, but as the free piston is falling again and during the time it rests in the socket before working gas pressure is admitted, the producing formation is at low pressure and oil may flow freely into the lower end of the well.

The free piston 6 may be characterized as comprising four units: first, the lift unit comprising the starting piston 10 and the packer 11 detailed in Figure 6A; second, the hold-down or latch unit detailed in Figure 6B; third, the trigger unit detailed in Figure 6C; and fourth, the by-pass and shock absorber unit detailed in Figure 6D. It will facilitate description and understanding to begin at the lower end of the free piston.

Any of various types of shock absorbers may be used. In the embodiment illustrated a collar 45 is adapted to make the initial contact with the abutment 23 at the lower end of the socket 7. The collar 45 is secured to the lower end of a shock absorber internal sleeve 46 which extends upward into and is slidably mounted within the tubular body 47 of the free piston 6.

Means are provided to limit velocity and distance of the axial motion of the shock absorber sleeve 46 with respect to the tubular body 47. This may conveniently take the form of an annular ring 50 protruding externally from the shock absorber sleeve 46 into an annular recess or dashpot 51 in the internal wall of the tubular body 47. The extremities of the dashpot 51 form abutments which limit the amount of travel of the ring 50.

Conveniently the recess may be filled with oil and slightly tapered so as to be smaller toward the upper end. The clearance between the ring 50 and the wall of the recess 51 will then grow smaller as the sleeve 46 moves upward within the body 47, and the resistance to motion will increase.

Conveniently, there may be placed at each end of the dashpot 51, seals 53 between the body 47 and the sleeve 46, whereby the oil may be retained within the dashpot 51. Preferably there is a small quantity of air or other gas also within the dashpot to accommodate thermal expansion. It is to be noted that there is an unobstructed passage for natural oil or other liquids to be produced to pass through the center of the shock absorber sleeve 46 and into the tubular body 47 thereabove.

As has been previously described, the external wall of the lower end of the body 47, together with the sealing rings 27, forms a valve which prevents flow of fluids through the by-pass 26 when the free piston 6 is in its socket 7.

The trigger unit 13 is detailed in section in Figure 6C and Figure 8. When the proper slug of oil has been built up above the free piston, the trigger unit operates to permit a center spindle 55 to move upward with respect to the body 47 under the force exerted by resilient urging means such as a spindle spring 56 (see Figure 6A). The center spindle 55 in turn operates to close a valve in the starting piston 10, to permit the expansion of packer 11, and to retract the latch head 12.

Conveniently the center spindle 55 may be severable into an upper center spindle 55a and a lower center spindle 55b to facilitate emergency recovery operations to be described below. However, the two center spindle parts are normally urged together by a tension spring 96 (see Figure 6B) and in all normal operations of the apparatus, the two halves 55a and 55b of the center spindle operate as one integral unit. The two parts 55a and 55b of the center spindle in combination, extend from the trigger unit 13 out the top of the free piston 6.

In the trigger unit 13, means are provided which are responsive to the difference between the head of oil or other liquid, which has been built up above the free piston 6, and the effective fluid pressure below the free piston. This means may take the orifice form described in my United States Patent Number 2,555,112 but this invention contemplates the use of a particular type of orifice, which results in a great improvement.

A venturi 60 is provided within the body 47 to pass fluids which rise through the bottom tube 24, the shock absorber sleeve 46 and the inside of the tubular body 47 to the outside thereof. Just prior to the instant of the first flow of oil, the pressure at the throat of the venturi 60 is approximately equal to the pressure at the input side of the venturi 60. As flow of oil through the venturi 60 progresses, however, a pressure differential will develop between the input side of the venturi and the throat thereof. This pressure differential will rise sharply as illustrated in Figure 5. As the column of oil builds up above the free piston 6, however, the pressure at the discharge side of the venturi will rise due to the head of the oil above it, thereby slowing the flow of oil through the venturi and reducing the pressure differential between the input side and the throat of the venturi. It is seen that the change in pressure differential between the input and the throat of the venturi is a function of the head of oil.

The use of a special kind of orifice, the venturi, and of the pressure differential between the intake side and the low pressure point therein, rather than the pressure differential between the intake and discharge sides of the orifice as described in my prior Patent 2,555,112 has many advantages. A more streamlined path may be provided for the flow of oil which avoids turbulence present on the downstream side of a conventional orifice, and consequently avoids emulsification tendencies. The streamlined shape is an important improvement over a non-streamlined orifice for another reason: The turbulence wastes energy and slows down the flow of oil thereby slowing down the entire pumping cycle. In the use of a venturi as compared with a conventional orifice restriction, the differential measured is the difference between the pressure occurring at the point of highest pressure and that occurring at the point of lowest pressure whereas, in conventional orifice usage, the differential measured is the difference between the pressure occurring at the point of highest pressure and that to which pressure recuperates on the downstream side of of the orifice after passing it. In addition, pressure recovery is usually better in venturi usage. In the result, a higher differential is made available for use while total pressure drop, turbulence, and emulsification tendencies are less and so the entire pumping cycle may be speeded up.

It is apparent that in alternative embodiments, the venturi might be placed in the socket 7, and the oil then passed therethrough, and the pressure differential then transmitted to the free piston 6. Or the venturi might be formed between a portion of the socket 7 and the wall of the free piston 6. Conveniently, the venturi may be lined with rubber or ceramics to prevent cutting with sand.

In the embodiment particularized in Figure 6C, wherein the venturi 60 constitutes passageways extending from the inside of the tubular body 47 to the outside thereof, means responsive to the venturi pressure differential is shown to take the form of an auxiliary piston 61. The lower side 62 of the auxiliary piston is subjected to the pressure on the intake side of the venturi 60. The upper side of the auxiliary piston 61 is subjected to the pressure at the throat of the venturi conducted by one or more passages 64 in the body 47 extending from the throat of the venturi to an annular space 65 within the body 47, and outside of a flexible sleeve or stocking 66.

The space within the flexible stocking 66 and above the auxiliary piston 61 is filled with clean oil and sealed so that any pressure exerted on the stocking 66 will be transmitted by the oil therein to the top of the piston 61. The only substantial passages for the flow of oil from above the auxiliary piston 61 to the chamber within the stocking 66 is the small restrictive passage 67 which permits only a slow movement of oil and thereby permits only a slow movement of the auxiliary piston 61. This necessarily slow movement of the auxiliary piston 61 precludes the possibility of a premature trigger operation due to excessive pressure on it at the instant of impact when a falling free piston encounters oil which may have risen in the production tubing between pumping cycles.

In order to limit the downward travel of the auxiliary piston 61, an annular abutment 69 is provided in the form of a protrusion from the internal wall of the body 47. Above the auxiliary piston 61 an annular ring 70 extends from the internal wall of the body 47. A compression spring 71 is mounted between the annular ring 70 and the top of the auxiliary piston 61 and normally urges the auxiliary piston 61 downward and against the abutment 69.

Within the trigger unit 13 there may conveniently be a guide tube 72 mounted in the body 47. The guide tube 72 houses the lower portion of the center spindle 55b and the upper end of an auxiliary piston spindle 73 which is secured to the top of the auxiliary piston 61. The top of the auxiliary piston spindle 73 is fitted with a knob 74 with tapered sides.

The lower end of the center spindle 55b is fitted with a trigger head 75. The upper face of the center spindle trigger head 75 is preferably perpendicular to the center spindle 55. The center spindle is normally locked in its lower position by the engagement of the center spindle trigger head 75 with detent means which may take the form of a trigger pawl 76. The trigger pawl 76 protrudes through an opening in the guide tube 72, and is a part of a trigger 77 which is shown pictorially in Figure 7A.

Just above the ring 70 the body 47 is slotted axially to provide accommodation for the trigger 77 (see Figure 8). A pin 81, shown pictorially in Figure 7B, extends across the slot and is the pivot pin for the trigger 77 which is rotatably mounted thereon. In the guide tube 72 there is an opening, and at the center of the pin 81 there is a recess which permits the pin 81 to be placed with its axis tangential to the lower center spindle 55b, and directly above the point of engagement between the center spindle trigger head 75 and the trigger pawl 76.

The trigger 77 is astatically balanced around the pin 81 so that there is no tendency for the trigger to rotate around the pin 81 when the free piston is subjected to jolts during its free fall.

At the lower end of the trigger 77 a toggle 84 is rotatably mounted. One end of the toggle 84 extends through an opening in the guide tube 72 and is adapted to engage the auxiliary piston spindle knob 74. The rotary motion of the toggle 84 is limted by a stop 85 against which it is normally held by a spring 86. The toggle 84 is permitted to rotate out of the way of the knob 74 as said knob ascends, but the stop 85 will not permit the toggle to rotate in the opposite direction. A trigger spring 87 is adapted to urge the trigger to rotate so as to move the trigger pawl 76 into position to engage the trigger head 75, and the toggle 84 to its innermost position to cooperate with the knob 74.

Before the free piston is dropped from the surface, the center spindle is moved downward. The upper face of the trigger pawl 76 and lower edge of the center spindle trigger head 75 are so tapered that the trigger head 75 will move the trigger pawl 76 outward against the urging of the trigger spring 87 until the trigger head 75 has passed the trigger pawl 76. The trigger spring 87 then urges the entire trigger to rotate so as to move the trigger pawl 76 into engagement with the center spindle trigger head 75. The trigger pawl thereby operates as detent means holding the trigger head 75 in its lower position.

Then the piston is dropped into the well and comes to rest in the socket 7. Gas pressure is applied and the pressure differential created at the venturi forces the piston 61 upward against the urging of the auxiliary piston spring 71. When this occurs, the auxiliary piston spindle knob 74 is urged against the toggle 84 from the lower side and the toggle 84 rotates permitting the knob 74 to pass upwards without rotating the trigger 77. The toggle spring 86 then rotates the toggle back into the position to engage the knob 74.

As the slug of oil is built up above the free piston 6, the differential pressure across the auxiliary piston decreases, and eventually the pressure differential will not be sufficient to oppose the force of the auxiliary piston spring 71. The auxiliary piston 61 then moves downward. The auxiliary piston spindle knob 74 also moves downward and engages the toggle 84 as it does so. The toggle 84 itself and the trigger arms which carry both the toggle 84 and the trigger pawl 76 move outward, thereby releasing the center spindle to yield to the urging of the center spindle spring 56 and move upward.

It is significant to note that the differential pressure at which the trigger mechanism operates is determined by the strength of the auxiliary piston spring 71 independent of variations in absolute pressure, and the effective pressure underneath the free piston will always be more than the head of the slug to be lifted by an amount determined by the auxiliary piston spring 71.

Means are provided for releasing the latch head 12 when the spindle 55 is moved upward. Conveniently, the latch head 12 may be one end of a latch arm 91 pivotally mounted near its center. At the opposite end of the latch arm 91 there may be a roller 92, adapted to cooperate with a spindle cam 93 located at the lower end of the upper center spindle 55a. When the upper center spindle 55a is in its downmost position and the trigger head 75 is engaged by the trigger pawl 76, the latch roller 92 will lie above the spindle cam 93 in accordance with the urging of a latch spring 94. When the center spindle trigger head 75 is released from engagement with the trigger pawl 76 and moves upward, the spindle cam 93 forces the latch roller 92 outward and the latch head 12 is withdrawn.

Means are also provided for retrieving the free piston 6 in the event that some failure of parts should prevent the trigger mechanism from automatically disengaging the latch head 12. The cam 93 attached to the lower end of the upper spindle 55a is normally held downwards with relation to the lower spindle 55b by a spring 96. When it is necessary to retrieve the free piston 6, a fishing tool adapted to engage a head 97 on the top of upper spindle 55a is lowered into the well and the upper spindle 55a is engaged and raised. The free piston 6, being held down by the latch head 12, also holds down the lower spindle 55b. However, the upward movement of the upper spindle 55a raises the cam 93 with respect to the free piston 6 and disengages the latch head 12, after which continued upward pull raises the entire free piston 6.

The lift unit is detailed in Figure 6A. In this unit the body 47 assumes a tubular form surrounding the spindle 55 and within the expansible packer 11. Conveniently the packer 11 may be of the type disclosed in my United States Patent No. 2,589,332, or it may be an expansible ring or other seal.

The expansible packer 11 is secured at its upper end to the body 47. At its lower end the packer 11 is integrated with a packer collar 98 which is slidably mounted outside the tubular body 47. The packer collar 98 may be urged upward whereby the packer 11 will be expanded by a packer spring 99. The packer spring 99 is attached at its upper end to the outside of the body 47 and at its lower end to the packer collar 98. Alternatively a self-expanding packer may be used, obviating the need for the packer spring 99.

Means may be provided to hold the packer 11 in a stretched condition in the form of apparatus for holding the packer collar 98 in a downward position. Preferably this is accomplished by a linkage between the packer collar 98 and an upper extension of the lower center spindle 55b whereby the packer collar will always be held down when the lower center spindle 55b is held down. Conveniently therefore, the lower spindle 55b is axially slotted leaving two parts 100 which extend beyond the cam 93 and on opposite sides thereof (see Figure 9). At a position generally within the packer collar 98, the two parts 100 rejoin at a top collar 101 which constitutes the top of the slot in the lower spindle 55b.

During emergency recovery operations the upper spindle 55a slides through the top collar 101 and lifts the cam 93 to which it is attached as previously described.

Adjacent to the top of the slot in lower spindle 55b, and on each side thereof, there are opposite slots 102 in the body 47 through which pass T-shaped keys 103. The heads of the two keys 103 are secured in the packer collar 98. The shafts of the keys 103 protrude through the slots 102 in the body 47 and slightly into the slot between the two parts 100 of the lower center spindle 55b. Further, the shafts of the two keys 103 may be engaged by the lower side of the top collar 101, whereby the movement of the lower spindle 55b downward to the position wherein the trigger pawl 76 engages the center spindle trigger head 75 also moves the keys 103 and the packer collar 98 downward and thereby stretches the packer 11. Conversely, when the center spindle 55b, of which the top collar 101 is a part, rises, the two keys 103 are left free to move thereby releasing the packer to expand and contract to conform to variations in diameter of the tubing in which it runs.

The top collar 101 may conveniently also provide the lower mounting for the spindle spring 56 (see Figure 6A). The top of the spindle spring 56 is secured to the body 47. Immediately above the top of the lower spindle 55b there is positioned on the upper center spindle 55a a collar 104. The collar 104 is adapted to engage the top of the lower spindle 55b and the spring 96 normally holds the two halves of the center spindle together during all normal operations.

It is apparent that fluids, including gas, may enter into the body 47 at the opening therein for the latch head 12 and at other places. Conveniently, therefore, a path for these fluids is provided upward through the body 47 so that there will be no gas pocket within the free piston 6. It is desirable to close that path when the lift stroke commences, however. This gas path closure may take the form of a seal 107 mounted on the upper spindle 55a and adapted to enter a cylinder 108 on the inside of the body 47 when the upper spindle 55a moves upward with respect thereto, but the seal 107 has a clearance around it when the upper spindle 55a is at the lower end of its travel.

As has been previously described, the packer 11, even though expanded, cannot function as a piston when the free piston 6 is in the socket 7 because of slots 32 which by-pass the packer 11. Means for preventing the flow of fluids past the free piston 6 into the production tubing are therefore provided in the form of a lift starting piston 10. The starting piston 10 is secured to and actually constitutes a part of the body 47. The external diameter thereof fits into the bore 20 of the socket 7. One or more passageways 110 are provided in the body 47 just below the starting piston 10 to permit the flow of fluids from around the packer 11 and from the slots 32 into the body 47 under the starting piston 10. An opening 111 in the starting piston 10 forms a path for the further flow of the fluids out of the body 47 into the production tubing 2 above the free piston 6.

Means are provided for closing the opening 111 when the upper spindle 55a moves upward. This may take the form of a valve 112 which is a part of the upper spindle 55a, and which moves into and seats on the rim of the opening 111 when the upper spindle 55a moves upward. The side of the opening 111 further acts as the stop or limitation of the upward travel of the upper spindle 55a. When a fishing tool lifts the head 97 at the top of the upper spindle 55a, the lead is transferred by the valve 112 to the body 47 through the rim of the opening 111.

When the free piston is falling freely in the production tubing, the sides of the starting piston may act as a guide for centralizing the free piston 6.

In alternative embodiments, such as that illustrated in Figure 10 for a large diameter packer, the slots 32 may be discarded and the main flow of fluids directed through the inside of the packer 11 through openings 113 within the packer. In this embodiment there are no openings 110 in the body 47, but the valve 112, the seat corresponding thereto and the starting piston function in the manner described above. In this embodiment there is no need for the seal 107.

A second guide for the falling free piston may be formed by the sides of the trigger unit 13 just above the venturi 60. The clearance between the trigger unit body and the production tubing is predetermined to restrict the flow of fluids therethrough. By this means the falling velocity of the free piston may be reasonably restricted. In free pistons for use in large size production tubing such as 4-inch tubing, a special falling velocity restrictor ring as illustrated in Figure 11 may be secured to the body of the trigger unit, whereby a predetermined clearance between said ring and the wall of the tubing is obtained.

The surface equipment used with either of the embodiments of the invention described may conveniently be substantially the same. The following description of the well surface apparatus relates first to the usage with the producing formation unprotected from the working pressure. This description is followed by a description of similar arrangements for use when the producing formation must be shielded.

A continuous gas pressure is maintained in the well casing annular 5 by a main gas line 114. Whether gas is supplied to or taken from this gas line 114 will depend upon whether or not the amount of gas released into the casing from the production formation is more than or less than the amount required to raise oil. The main gas line 114 is connected through the casing head 3 to the annular space 5 between the casing 1 and the production tubing 2. The production tubing 2 extends upward through the casing head 3 to a full bore valve 115. The full bore valve 115 is open during all normal operations of the equipment, and presents no obstruction to the movement of oil or the free piston 6 therethrough. The valve 115 is used when it is desired to open the tubing head to atmosphere while retaining gas pressure in the tubing below the valve such as when the free piston is being removed from or replaced in the tubing head. The production tubing 2 also extends above the full bore valve 115 a distance at least equal to the length of the free piston 6 and into a reload or priming housing 116.

Within the reload housing 116 the end of the production tubing 2 has a number of slots 107 through which oil may pass into a discharge or surface flow line 118. The slots 107 are situated above the normal terminal position of the packer 11 of the free piston 6. In addition, the production tube 2 has a number of holes or ports 119 situated below the normal terminal position of the packer 11. The purpose of the holes 119, in this embodiment wherein the producing formation is unprotected from the casing pressure, is to provide a by-pass around the packer through the annular space 120 between the production tubing 2 and the housing 116, and thereby to limit the extent to which a pressure differential can be built up across the packer 11 after it has reached the terminal position and before it has been reloaded and stretched. The holes 119 also admit production tubing gas pressure to the space 120 for other purposes hereafter referred to.

A discharge valve 122 shown in Figure 1 is opened at predetermined periods by a conventional pressure responsive power diaphragm and clock mechanism or valve actuator 123, and is closed by the same mechanism as hereafter described. The valve actuator 123 is always supplied with main line gas pressure through a line 121. When the free piston 6 arrives at the top, the starting piston 10 on the top of the free piston moves a lever 124 which is rotatably mounted at the extreme end of the production tubing 2 and which is normally urged to project through a slot 125 by a spring 126. The lever 124 in turn opens a free piston arrival pilot valve 127. The pilot valve 127 is continuously supplied with gas under pressure from the main gas line 114 by a line 128. The free piston arrival pilot valve 127, when opened by the lever, 124, passes gas pressure through a line 129 to the valve actuator 123. The actuator 123, responsive to the gas pressure received from the pilot valve 127, closes the discharge valve 122. It is desirable to note that the valve 122 is opened at predetermined times and is sustained in the open position until the arrival of the free piston 6, and is thereupon closed after all the slug of oil has been discharged in response to the arrival of the free piston 6.

Means are provided for positively catching the free piston when it arrives at the terminal position. This may take the form of a catch 131 which is rotatably suspended from the top of the production tubing 2 and is urged by a spring 132 through a slot 130 in the production tubing 2 whereby it will catch beneath the starting piston 10. The catch 131 may be released by a release lever 135 which is rotatably mounted on a lug projecting from the production tubing 2. The upper end of the release lever 135 is adapted to engage the lower end of the catch 131 and to urge the catch 131 outward so as to release the free piston 6 when the lower end of the release lever 135 is urged inward by the operation of a pressure responsive release piston 137. The release piston 137 is operated in a release piston cylinder 138 mounted in the wall of the housing 116.

One face of the pressure responsive release piston 137, is open to pressures in the housing 116 and is hereinafter referred to as the inside face. The pressure in the housing 116 will increase from the time of the first arrival of oil to an appreciably higher pressure at the time of the arrival of the free piston 6. By means hereafter described, the outward side of the release piston 137 is subjected to atmospheric pressure at all times except at the time when the free piston 6 is ready for dropping. On the outside face of the release piston 137 there is a release spring 139. When oil is being delivered, the pressure in the annular space 120 rises sufficiently to move the release piston 137 outwardly before the free piston 6 arrives, thereby freeing the catch 131 for operation to catch the free piston 6 when it arrives.

Alternatively, electromagnetic or other means may be used to catch the free piston.

Conveniently there may be a superstructure 140 on top of the housing 116 which houses a shock absorber substantially identical to the one carried in the lower end of the free piston 6. The plunger of the shock absorber may be a tubular member 141 slidably mounted within a cylindrical chamber in the superstructure 140, and normally protruding below the superstructure 140 into the top of the tube 2 and adapted to engage the starting piston 10 on the top of the free piston when it arrives at the surface. Within the superstructure 140 and externally of the tubular member 141, there may be an annular dashpot 142 which is substantially filled with oil and sealed at its ends. Protruding from the outside wall of the tubular member 141 and into the dashpot 142 is a ring which is constructed to have a predetermined clearance with the walls of the dashpot 142. The previously mentioned term "terminal position" applied to the free piston 6 will now be clearly understood to be that position to which the free piston will return after the shock absorber has permitted some overtravel.

Within the top of the tubular member 141 there is a priming or a reload rod 143 which extends out through the top of the superstructure 140 and into a reload cylinder 144. The shock absorber tubular member 141 is normally urged downward and the reload rod 143 upward by a spring 146 connecting the two members.

It is desirable to note that the upper spindle 55a of the free piston 6 extends into the shock absorber tubular member 141 when the free piston 6 has been caught by the catch 131. Means are provided to urge the priming or reload rod 143 downward into engagement with the upper spindle 55a of the free piston 6, and further to thereby urge the upper spindle 55a downward until it is primed by being locked in its lower position by the trigger pawl 76 within the free piston 6. This may conveniently take the form of a reload piston 147 which is slidable within the reload cylinder 144 and which is adapted to engage the top of the reload rod 143. The lower end of the reload cylinder 144 has an atmospheric vent 148.

The pilot valve 127, in addition to providing gas pressure to the actuator 123, may be adapted to supply gas pressure by way of a line 149 into the space above the reload piston 147. The gas pressure admitted above the reload piston 147 operates to move the reload piston 147 downward. The reload piston 147 moves the reload rod 143 downward, and in turn, the reload rod 143 moves the upper spindle 55a downward until the trigger head is caught by the trigger pawl 76 and the free piston 6 is thereby primed or reloaded.

The reload cylinder 144 may be fitted with a reload cylinder head 150. Within the reload cylinder head 150 there may be a passage 152 connecting the inside of the reload cylinder 144 to the atmosphere. An inside valve 154 normally prevents passage of gas from inside the reload cylinder 144 to the passage 152. The inside valve 154 is supported by a valve stem 155 which also supports an outside valve 156. The outside valve is normally urged into its uppermost and open position by a light spring 157, thereby opening the passage 152 to atmosphere. Conveniently, there may be connected between the passage 152 and the outward side of the release piston 137 a line 158, through which the outward side of the release piston 137 is normally opened to atmosphere as aforesaid.

Means are also provided for the movement of the reload piston 147 to release the free piston 6 after the reload piston 147 has moved the distance necessary to reload the free piston 6. A reloading piston rod 160 is secured to the top of the reloading piston 147 and protrudes through the reload cylinder head 150. At the top of the reload piston rod 160 there may be a washer 161 which is adapted to engage the outside valve 156 towards the end of the travel of the reload piston 147. The action of the washer 161 is to close the outside valve 156 and simultaneously open the inside valve 154, whereby the passage 152 and the line 158 are open to the gas pressure above the reload piston 147. The line 158 transmits the gas pressure to the outside of the release piston 137, thereby cancelling the pressure difference previously acting on that piston. The spring 139 then moves the release piston 137 inward, whereby the free piston 6 is dropped. As the free piston 6 falls freely through a column of gas that is virtually static, it accelerates until its velocity reaches a value at which there is maintained a difference in pressure on the two sides of the free piston which, multiplied by the free piston area, equals the weight of the free piston. The said pressure difference is the function of the restricted annular space between the inside of the tubing and the outside diameter of the trigger unit 13.

Means are also provided for preventing the automatic releasing of the piston 6 when so desired. This may take the form of a release piston rod 170 which is secured to the release piston 137 and projects through the head of the release cylinder 138. A nut 171 may be screwed down on the release piston rod 170 to engage said cylinder 138 and lock the release piston 137 in the outward position, thereby preventing the dropping of the free piston 6.

If it is desired to recover the free piston for servicing, the full bore valve 115 may be closed to prevent the escape of gas from the production tubing 2. The reloading assembly may then be opened after atmospheric pressure has been conveniently established inside it, and the free piston 6 taken out.

In the operation of the last above described embodiment of the invention wherein the formation is not shielded, the pumping cycle may be started by inserting a primed free piston 6 in the production tubing above the closed valve 115 and assembling the reloading equipment. The full bore valve 115 is then opened and the lock nut 171 is unscrewed so that the release piston 137 is free to yield to the urging of the release piston spring 139, move inward, rotate the pivot 135 which in turn retracts the catch 131, dropping the free piston 6.

As the free piston 6 drops, its velocity will be controlled by the restricted passage for gas to pass between the production tubing 2 and the external wall of the trigger unit 13, or in the case of a large size unit, the space between the producing tubing 2 and a special falling velocity restrictor ring mounted on the outside of the trigger unit 13 as shown in Figure 11. During the fall the latch head 12 will be urged outward by the spring 94, but the lower edge of the latch head 12 is so shaped that it will slide along the tubing wall. When the free piston 6 reaches the socket 7, the shock absorber will stop the fall and the latch head 12 will engage the shoulder provided therefor in the socket 7.

The pressure of gas in the casing 1, as previously described, is maintained by supplying or taking off gas through the main gas line 114. Before the free piston 6 arrives, gas may pass through the by-pass 26; it follows therefore that the production tubing 2, upon arrival of the free piston 6 in the socket 7, is substantially at the casing gas pressure.

The clock in the actuator 123 is set for a predetermined number of pumping cycles per day and nothing further occurs until it is time for another cycle to take place. At the proper time, the clock 123 opens the discharge valve 122, thereby bleeding off all the gas pressure in the production tubing 2 above the free piston 6, and creating a pressure differential between the casing 1 and the production tubing 2. The pressure in the casing 1 forces oil up the bottom tube 24, into the shock absorber sleeve 46 and out the venturi 60, creating a pressure differential which urges the auxiliary piston 61 upward until the knob 74 slips past the trigger toggle 84.

The oil passes through the venturi 60 and into the socket chamber 8, upward around the body of the free piston 6 into the bore 20, into the slots 32 by-passing the packer 11, back through the passageways 110 into the body of the free piston 6, upward through the opening 111 in the starting piston 10 and into the production tubing 2 above the free piston 6. Upon the opening of the gas discharge valve at the surface, the gas pressure difference between the casing and the tubing rises much more rapidly than an oil slug can be built up in tubing above the free piston and this insures that the effective pressure underneath the free piston 6 and upstream relative to the venturi 60 will approximate full working pressure throughout the latter and by far the larger part of the time occupied in building up the slug of oil in tubing 2, thus providing the before described conditions for operating the free piston trigger release. As a head of oil is built up in the production tubing 2, the pressure on the discharge side of the venturi 60 increases and the rate of flow of oil decreases, allowing the depressed pressure at the throat of the venturi to recover and the pressure differential acting on the auxiliary piston 61 to decrease. When this decrease in differential pressure reaches a predetermined value, the auxiliary piston spring 71 moves the auxiliary piston 61 downward. The knob 74 also moves downward, engages and moves the trigger toggle 84 and the end of the trigger 77 outward. The trigger pawl 76, carried by the trigger 77, also moves outward, releasing the center spindles 55a and 55b to rise in accordance with the force exerted by the center spindle spring 56.

As the lower spindle 55b rises, carrying the upper spindle 55a with it, the cam 93 rises, moves the roller 92 outward and effects the retraction of the latch head 12. The lower spindle top collar 101 rises, thereby releasing the packer collar 98 to respond to the urging of the packer spring 99 and effecting the expansion of the packer 11 to form a sliding seal with the production tubing 2, and to form a substantially impermeable plug therein.

The valve 112 also rises, closing the opening 111, thereby preventing the flow of fluids past the starting piston 10. The pressure below the piston being greater than that above it by an amount predetermined by the auxiliary piston spring 71 and adequate to lift the free piston as soon as it becomes effective, the free piston 6 commences to rise to the surface. As soon as the starting piston 10 passes out of the bore 29, the clearance around it becomes great enough that it no longer functions efficiently as a piston, but the packer 11 will then have moved beyond the ends of the slots 32 and will make a proper seal to effect the desired lift.

When the free piston leaves the socket 7, gas passes through the by-pass 26, thereby adding to the already existing pressure excess underneath the free piston by an amount proportional to the head of oil in the bottom tube 24.

When oil reaches the reloading housing 116 it commences to flow out into the discharge oil flow line 118. As oil flow progresses the velocity increases as the head of the slug still to come out of the production tube 2 diminishes. At the same time the friction and other resistance to oil flow increases. Accordingly the pressure in the reload housing 116 increases until it is adequate to force the release piston 137 outwards against atmospheric pressure and against the release spring 139 and, by removing influence from the release lever 135, allow the catch 131 to be moved inwards by the spring 132. It is apparent that the catch 131 will then be ready to catch the free piston 6 on its arrival.

When the free piston 6 arrives at the surface it is brought to rest by the shock absorber 141 and is automatically and positively caught by the catch 131. The lever 124 moves outward opening the free piston arrival pilot valve 127. Gas pressure derived from the main gas line 114 by the line 128 is then supplied to the discharge valve actuator 123 which closes the discharge valve 122, thereby maintaining gas pressure in the production tubing 2 and reload housing 116. This gas pressure continues to urge the release piston 137 outward thereby preventing untimely release of the free piston 6.

The piston arrival pilot valve 125 also admits gas pressure to the top of the reload piston 147. The reload piston 147 moves downward, thereby moving the reload rod 143 downward. The reload rod 143 engages the head 97 of the upper spindle 55a and moves the upper spindle 55a downward until the trigger pawl 76 engages the center spindle trigger head 75, thereby effecting the reloading of the free piston 6 for the next cycle.

The reload piston rod 160 and the washer 161 move downward with the reload piston 147 and engage the outside valve 156, closing the outside valve 156 and simultaneously opening the inside valve 154. High pressure gas from above the reload piston 147 is admitted to the line 158 and is transmitted to the outside of the release piston 137, thereby cancelling the pressure differential which has previously moved the release piston 137 into the cylinder 138, whereupon the spring 139 moves the piston 137 out of the cylinder 138, rocking the lever 135, withdrawing the catch 131, and releasing the free piston 6.

When the two tube, formation shielded equipment illustrated in Figure 3 is used, it is preferred to add a surface venturi 178 shown in Figure 15 in the discharge line 118. The clock and pressure responsive valve actuator is placed in the main gas line 114, and in this embodiment will be designated 123a. Since this embodiment is normally used only on wells without high pressure gas production, the main gas line 114 becomes a surface gas input line. The discharge valve 122 of the previously described embodiment becomes the input gas line valve 122a. There is no need for the reload piston washer 161, the inside valve 154 or the outside valve 156. The line 158 is removed and the back of the releasing piston 137 opens directly to atmosphere at all times. The full bore valve 115 may also be dispensed with. An auxiliary gas pipe 183 may be connected to the casing 1 through the casing head 3.

In the operation of this embodiment of the invention, the surface gas input line valve 122a is normally closed and production tubing 2 is open to a low receiver pressure through the discharge flow line 118. The gas input pipe 34 will also be bled to a similar low pressure through the by-pass 26 and production tubing 2 before the free piston reaches the socket bore 22 and closes the by-pass 26. Assuming that a correctly reloaded free piston is in the reload head suspended by the catch 131, the nut 171 may be backed off to unlock the release piston 137. One side of the release piston 137 is open to a low receiver pressure and the other to atmospheric pressure, so the release piston spring 139 operates to withdraw the catch 131 and drop the free piston 6 as aforesaid. The free piston 6, on reaching bottom, is locked in the socket 7 as previously described.

The free piston 6 may rest in the socket 7 for a predetermined time. During this time oil flowing from the formation opens the bottom valve 40 and fills the displacement chamber 36. At the proper time the clock in the actuator 123a opens the main gas line valve 122a, thereby admitting gas under pressure to the gas input pipe 34. This gas pressure is transmitted to the bottom chamber 36 and operates to close the bottom valve 40. The flow of oil through the bottom tube 24 and the free piston 6 to build up a slug of oil above the free piston 6 takes place in the manner previously described. Likewise the free piston 6 is released when the proper slug of oil has been built up, and the oil and the free piston rise to the surface.

As the oil slug is rising up the production tubing 2, the gas contents of the tubing move ahead of the oil out through the slots 107 at the top of the tubing 2 and along through the surface discharge venturi 178 to the discharge flow line 118. This flow of gas is at an insufficient velocity to create any appreciable pressure drop at the throat of the venturi 178. When the liquid arrives at, and flows through, the surface venturi 178, the velocity is the same as that of the gas preceding it, but the specific gravity is much higher and a substantial pressure drop is created. It will be recalled that when the pumping cycle commenced with the clock timed opening of the main gas line valve 122a, the open position of the valve was self-sustained. The pressure drop created in the throat of the venturi 178 is conducted by a small pipe 179 to the clock timed and pressure responsive actuator 123a to effect the closing of the valve 122a.

It is significant to note that in the equipment previously described in relation to wells in which the producing formation is not shielded from the working gas pressure, the clock timed and self-sustained valve opening is terminated and the valve 122 is closed by a pressure rise supplied by the free piston arrival pilot valve 127 on the arrival of the free piston 6; whereas, in the equipment now described for use under other well conditions, the clock timed and self-sustained valve opening is terminated and the valve 122a is closed by a pressure drop supplied by the venturi 178 on the arrival of the top of the oil slug. Alternatively, a simple choke (not shown) may be used in the discharge flow line 118 in place of the venturi 178; the actuator 123a will then be adapted to be responsive to a pressure rise created in the tubing head by the arrival of the oil at the choke.

The gas beneath the free piston 6 continues to lift the oil and free piston expansionally. The decrease in the weight of the slug of oil as oil flows out the surface venturi is more rapid than the loss of gas pressure due to the expansion of gas, and the free piston moves on up to the surface rapidly. The shock absorber, the free piston catch 131, the lever 124, pilot valve 127 and reload mechanism operate in the normal manner, but no valve is closed in the discharge surface flow line. The gas under the free piston 6 passes through the holes 119 into the reload housing space 120 and out the venturi 178, by-passing the packer 11 until the reloading operation has occurred. When the packer is stretched there is an additional passage around the packer. The bleeding off of gas pressure continues until the subsurface equipment has returned to approximately receiver pressure, thereby enabling oil to again flow freely into the lower chamber through the bottom valve 40. The release spring 139 will continue to be urged outward until the production tubing 2 has returned to approximately receiver pressure; by this time the rapid upward flow of gas in the production tubing will have abated substantially, and the free piston will not be dropped into a rapidly rising gas column.

It is interesting to note that in this embodiment the free piston can be removed from the system for servicing without the need for closing a full bore valve 115, because the system may be reduced to atmospheric pressure after a pumping cycle, whereas in the embodiment first described, the system was maintained at high pressure.

The single tube equipment in which the formation is shielded from operating pressures by a packer, as illustrated in Figure 4 may be operated by substantially the same cycle as the two-tube equipment just described, but such a cycle would result in unnecessary waste of gas since the entire volume of the casing must be pressurized and then allowed to bleed down to receiver pressure at each cycle. Means may therefore be adopted to retain the gas pressure in the casing annulus. Such means may take the form of a valve 43 responsive to pressure at the intake side of the passage 38 from the casing 1 into the bottom chamber 36. When the gas inlet valve 122a opens, the casing pressure rises until it reaches a predetermined value at which the valve 43 opens. This opening pressure may be in excess of the desired pumping pressure. When the valve 43 opens, the operation takes place in the previously explained manner. Valve 122a continues to supply gas to the casing in sufficient volume and pressure to maintain the casing pressure at a value higher than that at which the valve 43 will close. This closing pressure may be at or under the desired pumping pressure. When the top of the oil column reaches the venturi 178 and creates a pressure drop therein, the actuator 123a closes the valve 122a. The gas pressure in the casing then falls until the valve 43 closes and the gas pressure then underneath the free piston 6 is utilized expansionally to complete the production of the oil and bring the free piston to the tubing head.

Alternatively, the actuator 123a may be arranged to close the input valve 122a after the casing gas pressure has reached a predetermined pressure sufficient to insure an adequate supply of gas to lift the oil before reclosing pressure for the valve 43 is reached.

In another alternative, the actuator 123a may be arranged to close the input valve 122a when a predetermined time shall have elapsed since the opening moment. Also, the closure of the input valve 122a could be arranged to occur on the arrival of the oil, on the casing pressure rise, or on the lapse of a predetermined time, whichever of the three occurred first.

After the arrival of the free piston at the tubing head it is reloaded and the gas then contained in the tubing exhausts down to low pressure, and when the predetermined pressure at which the release piston 137 functions is reached, the free piston is automatically released.

In any form of equipment where casing packers are not used, whether casing pressure is low or high, it may occur on occasion that during a period of non-operation, the liquid level in the well rises to an abnormally high point, which would prevent the initial operation of the invention. Means are therefore provided for reducing the oil level in the well to normal. This may take the form of a series of conventional gas lift flow valves 180 (see Figure 2) attached to the production tubing string 2. These valves are then used in accordance with conventional gas lift practice known to those familiar with the production of oil by gas lift to lower the level of the oil in the well to a proper level before bringing the free piston into operation. It will be understood, however, that these valves will operate only at pressures higher than the normal working pressure for the invention and will remain closed and inoperative during all normal operations.

Figures 16, 17, 18 and 19 illustrate an alternative and simplified embodiment of the invention, wherein many of the previously disclosed parts and their functions are omitted. The simplified free piston 206 is adaptable for use with the various embodiments of well equipment previously disclosed, but in the embodiment illustrated, well equipment is used wherein the formation is shielded from the working pressure at all times except during the displacement and pumping portions of the cycle. With this well equipment, also adaptable for use with the more complex free piston, the lower portion of the well serves as the displacement chamber.

The well is equipped with a casing 1 and a production tube 2, with a surface discharge line 118 and a main gas line 114 fitted with a gas imput valve 122a, all as in previous embodiments. Although most of the rest of the previously described surface equipment is unnecessary, it is preferable for the production tube 2 to extend sufficiently far above the connection of the surface discharge line 118 to provide room for the simplified free piston 206 to move above the discharge line 118. If desired the surface equipment may include a shock absorber, a free piston catch, and/or means for by-passing the free piston when it nears the discharge line, all as previously described.

The bottom hole well equipment in the simplified embodiment illustrated may include the casing packer 42 and the conventional gas lift flow valve 43 placed in a passage through the packer as previously described. The conventional bleed valve 44 is also used. Conveniently there may be an abutment 208 at the bottom of the production tube 2; the socket of the previously described equipment may be discarded. A simple hole 209 is placed in the production tube 2 adjacent to the abutment 208, forming a passage for the movement of fluids into the production tubing.

A simplified free piston 206 is illustrated in section in Figure 16. The packer 11 used in the simplified free piston is preferably of the type described in my Patent Number 2,589,332. The packer 11 is secured at one end to a body 247. The body 247 may take a cylindrical form, closed at one end. The other end may be closed with a sleeve-piston 248 which is adapted to move inwardly and outwardly, i. e., upward and downward respectively in the drawing, within the body 247. On the outside of the sleeve-piston 248 there is a sleeve 252. Conveniently, there may be a seal 249 between the sleeve-piston 248 and the body 247. The body 247 and the piston 248 define a pressure chamber 250, normally at approximately atmospheric pressure.

Means are provided whereby movement of the sleeve-piston 248 in an outward direction will stretch the packer 11, thereby causing the walls of the packer to be retracted so that the diameter of the packer is less than its natural diameter. This may take the form of a rod 256 secured to the back of the sleeve-piston 248, said rod extending to and being secured to a spider 257. The spider 257 is positioned adjacent the opposite end of the packer from the body 247, and is adapted to engage the end of the packer 211 when the sleeve-piston 248 moves outward so as to stretch the packer.

Resilient means are provided to urge the sleeve-piston 248 outward to stretch the packer. Conveniently this may take the form of a spring 260 positioned between the body 247 and the spider 257 as illustrated. Alternatively, the spring 260 may be placed at other places, such as within the pressure chamber 250. The thrust of the spring 260 is chosen so that when the pressure resulting from a predetermined head of oil in the production tube 2 above the simplified free piston 206 is exerted on the outside of the sleeve-piston 248, the resilient spring 260 and the gas within the pressure chamber 250 will yield to the force on the outside of the sleeve-piston 248 so that the sleeve-piston 248 will move inward. The spider 257 will thereby be retracted from the end of the packer 11 and the packer will expand in accordance with its own natural tendency to return from its retracted to its normal condition. In expanding, the packer will form a substantially impermeable plug within the production tube 2.

Conveniently there may be a shock absorber on either end of the simplified free piston 6. In the embodiment illustrated, a shock absorber spring 262 is placed on the bottom of the packer 11.

Means may also be provided whereby fluids may flow through the inside of the packer 11 until the desired column of oil has built up above the simplified free piston 206. This may take the form of a passage formed by holes 258 in the spider 257, holes 254 in the sleeve 252, and holes 251 in the body 247. The passage may be closed in the manner of conventional sleeve valves, by the upward movement of the sleeve 252.

A slot 266 in the sleeve 252, constructed to cooperate with a pin 267 projecting inward from the body 247, may be used to prevent rotation of the sleeve-piston 248 within the body 247, and thereby prevent the holes 251 and 254 from becoming misaligned.

It is important to the best operation of the simplified free piston 206 that the pressure chamber 250 be recuperative. Therefore, means are provided whereby fluids which may have leaked into said pressure chamber 250 while the free piston 206 is in a zone of high pressure, will automatically escape therefrom each time the simplified free piston 206 reaches a zone of low pressure. This may take the form of a lightly loaded spring check valve 268 placed in a passage 269 through the piston 248. The check valve 268 is normally urged closed both by its spring and by pressure on the outside of the sleeve-piston 248, but it will open automatically when the pressure within the pressure chamber 250 exceeds the pressure on the outside of the sleeve-piston 248 at the end of the pumping operation. This pressure will normally be approximately atmospheric pressure.

Conveniently the passage 269 is placed in or near the bottom of the pressure chamber 250 so that when recuperation occurs, liquids will be the first fluids to escape from the pressure chamber 250.

As in the previously described embodiments of the invention, it is preferable to have a series of conventional gas lift valves 180 disposed along the production tubing 2 for use when the well has become too full of oil during nonproducing periods.

When operation of the simplified embodiment of the invention commences, the annular space 5 inside the casing may be at a pressure of 240 p. s. i., for example. The production tube 2 is at approximately atmospheric pressure. The valve 43 is closed. The pressure chamber 250 in the simplified free piston 206 is also at approximately atmospheric pressure and the packer 11 is stretched as the simplified free piston is dropped into the well.

A predetermined time, which may be measured by a clock valve actuator similar to that described in connection with previously described embodiments of the invention, is allowed to elapse, during which oil flows into the well. Oil may rise up to the bleed valve 44 in the casing. It may rise higher in the production tube 2.

After said predetermined time has elapsed, the main gas valve 122a opens and the gas pressure in the annular space 5 is raised. At 250 lbs. per square inch the valve 43 opens admitting gas under pressure to the lower well below the casing packer 42 and oil is displaced therefrom into the production tube 2. It flows both through and around the free piston 206 and builds up a slug of oil thereabove. As the slug of oil builds up, the pressure on the outside of the sleeve-piston 248 increases as a result of the increasing head of oil above it.

As a slug of oil is being built up, the force on the outside of the sleeve piston 248 resulting from the head of oil increases and compresses the spring 260. The rise in pressure within the pressure chamber 250 is relatively small. The sleeve-piston 248 then moves upward, thereby closing the sleeve valve 254 and releasing the packer 11 to expand and become an impermeable plug in the tubing. The simplified free piston 206 then rises to the surface lifting oil ahead of it.

The gas input valve 122a may be closed after a predetermined time, or in response to the pressure rise within the annular space 5, so that the quantity of gas injected is appropriately limited. This closure normally occurs before the oil slug arrives at the surface and the last portion of the lift is affected by expansion of the gas. During this expansion the pressure within the annular space 5 falls off to 240 lbs. and the valve 43 closes. Further movement of the simplified free piston 206 will be accomplished by the expansion of gas within the production tube 2 and the lower portion of the well below the casing packer 42.

The oil above the simplified free piston 206 will flow out the discharge line 118. The terminal position of free piston 206 will be such as to leave the discharge line 118 open until the gas beneath the piston has bled off to approximately atmospheric pressure. The spring 260 will then move the sleeve-piston 248 outward, re-open the holes 251 and 254, and stretch the packer 11. The free piston 206 is again ready to fall into the well. If any fluids had leaked into the pressure chamber 250, the valve 268 will, at this time, open and effect the recuperation of the low pressure in the pressure chamber 250.

Conveniently the length of the production tube 2, below the bleed valve 44 may be chosen so that the volume within the casing 1 below the bleed valve 44 will not exceed the volume of the slug of oil it is desired to pump. A desirable pumping level for the oil will then be at the level of the bleed valve 44. When the oil is at this level, there will be displaced into the production tubing above the free piston 206, a measured slug of oil— namely that volume of oil within the casing 1 between the bleed valve 44 and the hole 209. When this volume of oil has moved into the production tube 2 above the free piston 206, the oil outside the production tube above the hole 209 will have been displaced. Oil displacement into the production tube 2 ceases and gas passes into the hole 209 to move the free piston 206 up. If the production tube 2 extends further down into the well just indicated, the desirable pumping level will be below the bleed valve 44; conversely, if the production tube 2 is shorter, the desirable pumping level be one in which the oil has risen within the production tube 2 to some point above the bleed valve 44.

It will be understood that modifications can be made in the invention as herein described without departure from the spirit thereof, and therefore, that the description is to be construed as illustrative only.

I claim:

1. Apparatus for raising liquid in a well by gaseous pressure, including a free piston adapted to be primed and to move up and down in tubing, in combination with means for catching and holding said free piston while said free piston is being primed, means for priming said free piston while being so held and means responsive to operation of said priming means for releasing said free piston after it has been primed.

2. Apparatus for raising liquid in a well by gaseous pressure, including a free piston adapted to be primed and to move up and down in tubing, means connected to the tubing for priming said free piston, and means responsive to the arrival of said free piston at said priming means for energizing said priming means.

3. Apparatus as claimed in claim 2 in combination with means for catching and holding said free piston while said free piston is being primed.

4. In apparatus for lifting liquid in a well by gaseous pressure including a free piston adapted to be primed and to move up and down in a tube, a main gas line for conveying gas to and from said well to provide said gaseous pressure, and a liquid discharge line from said tube, the combination therewith of means to catch and hold said free piston, means for priming said free piston, said means for priming being responsive to the arrival of said free piston at said priming means, closure means for terminating flow of gas in said gas line, and means responsive to flow of liquid in said liquid discharge line and having an operating connection with said closure means to operate the closure means responsive to said liquid flow.

5. In apparatus for lifting liquid in a well by gaseous pressure including a free piston adapted to be primed and to move up and down in a tube, and a liquid discharge line from the tube, the combination of means to catch and hold said free piston, means for priming said free piston while so held, said means for priming being responsive to the arrival of said free piston at said priming means, and means for closing said liquid discharge line, said closing means being responsive to the arrival of said free piston near said priming means.

6. Apparatus for lifting liquid in a well by gaseous pressure including a free piston adapted to be primed and to move up and down a tube, and a liquid discharge line from the tube, in combination with means for priming said free piston, means for closing said liquid discharge line, and means responsive to the arrival of said free piston at a predetermined point in the tube to energize said closing means to close said liquid discharge line.

7. Apparatus for lifting liquid in a well by gaseous pressure including a free piston adapted to be primed and to move up and down in a tube, a main gas line, and a discharge line from the tube, in combination with means for priming said free piston, said priming means being actuated responsive to the arrival of said free piston at said priming means, means for catching said free piston and holding said free piston while it is being primed, means for releasing said catching and holding means, said releasing means being inoperative until after the time for the free piston to have been primed.

8. Apparatus as claimed in claim 7 in combination with closure means for terminating the flow of gas in said main gas line, said closure means being responsive to a predetermined condition within the apparatus.

9. Apparatus as claimed in claim 7 in combination with closure means for terminating the flow of gas in said main gas line, said closure means being adapted to operate at a predetermined time.

10. Apparatus as claimed in claim 7 in combination with means for closing said discharge line, said closure means being responsive to the arrival of the free piston at a predetermined point.

11. Apparatus for raising liquid in a well comprising in combination, a liquid production tube, a free piston movable up said production tube to elevate liquid above the piston, said free piston providing a substantially impermeable plug slidable within said tube, a by-pass passageway from below to above said plug, means for opening said passageway, latching means for engaging the piston upon its arrival at an upper portion of said tubing, piston reloading means for actuating said passage opening means, means responsive to the arrival of said free piston at said upper portion for actuating said piston reloading means and means for releasing said latching means after said reloading means has been actuated.

12. Apparatus as defined in claim 11 wherein said release means includes a latch engageable with the piston and a pressure responsive actuating element in communication with the tubing pressure and adapted to disengage said latch in response to the occurrence of a predetermined pressure.

13. Apparatus as defined in claim 11 wherein said releasing means is actuated after said reloading means has moved to reload said free piston.

14. For use in apparatus for raising liquid in a well by gaseous pressure including production tubing and a piston adapted to move up and down in said tubing and including as a part thereof sealing means adapted to make a sliding seal with the walls of said tubing, a socket adapted to be secured to the lower end of said tubing and adapted to receive said free piston at the lower end of its travel and having an inner surface opposite said sealing means with the piston in the socket, said socket including by-pass passageways outwardly disposed of said surface and adapted to permit flow of fluids around said sealing means when said piston is in said socket.

15. As a subcombination, a socket comprising a conduit with a passageway therethrough including smaller, intermediate and larger internal diameter portions, the larger diameter portion being disposed between the smaller and intermediate diameter portions, longitudinally disposed fluid passageways in the walls of said intermediate diameter portion and extending a substantial part of the length thereof, said smaller diameter portion having an inner annular face providing spaced apart sealing surfaces for sealing means insertable thereinto, and a port connecting the exterior of the conduit with the interior thereof intermediate said sealing surfaces.

16. The apparatus defined in claim 15 characterized by the addition of a venturi through which fluids may be constrained to flow.

17. In a free piston for use in raising liquid through a tube, a starting piston, an expansible packer adapted to make a sliding seal with the wall of said tube, a passage within said packer and through said starting piston for flow of well fluids from one end of the free piston to the other, and closure means adapted to close said passage and prevent the flow of fluids therethrough.

18. In apparatus for use in raising liquid through a tube by action of gaseous pressure, a free piston comprising an expansible seal, a socket adapted to receive said free piston, means for causing said liquid to flow from below said free piston through at least a portion of said free piston and into said tube above said free piston while said free piston is positioned in said socket, by-pass means whereby said liquid may flow easily past said expansible seal, means for closing said portion of said free piston whereby said flow of liquid from below said free piston into said tube above said free piston is terminated and a force transmitting connection between said closing means and said seal to expand the latter upon closing of said portion.

19. Apparatus as claimed in claim 18 wherein said closing means is responsive to a change in pressure differential, a venturi situated in the path of liquid flowing from below to above said piston whereby a high pressure is built up on the input side of said venturi and a low pressure is created at the throat thereof, and means connecting said closing means to said input side and throat of said venturi, said change in pressure differential being a function of a head of liquid building up above said venturi thereby decreasing the flow therethrough.

20. In a free piston for use in apparatus for raising liquid through a tube by action of gaseous pressure and adapted to move upward and downward in said tube through fluids and when at the lower extremity of said downward movement to become a substantially impermeable plug, means responsive to a change in pressure differential whereby said free piston is converted into said impermeable plug, a venturi situated in the path of liquid flowing from below to above said piston whereby high and low pressure points are created at the input and throat of said venturi respectively, said change in pressure differential being a function of the increase in head of liquid above said venturi and means for transmitting pressure at said points to said pressure responsive means to convert said piston to said impermeable plug upon predetermined increase in said head.

21. In a free piston for use in apparatus for raising liquid in a well by gaseous pressure, said apparatus including a tube and a socket for said free piston at the lower end of said tube, said piston being adapted to move up and down in said tube and to be positioned in said socket while said liquid is caused to flow upwardly to form a liquid column above said free piston, the combination of a passage in said free piston through which fluids may normally flow from a point below to a point above said piston, closure means adapted to close said passage thereby forming a substantially impermeable plug in said tube, said closure means being responsive to a change in pressure differential, a venturi in fluid communication with said passages so that said liquids are constrained to flow through the venturi in passing from below to above said piston whereby said pressure differential is obtained, said change in pressure differential being a function of the progressive growth of the head of said liquid column whereby the rate of flow of liquid through said venturi is decreased.

22. Apparatus for raising liquid in a well by gaseous pressure including a free piston adapted to move up and down in a tube, said free piston including an expansible packer, characterized by said free piston having a passage therein through which fluids may be constrained to flow, said free piston having a venturi whereby a pressure differential is obtained and means responsive to said pressure differential for closing said passage and having a force transmitting connection with said expansible packer to cause it to expand upon closing of said passage.

23. In a free piston adapted to travel up and down a tube in the raising of liquid from a well by gaseous pressure and adapted to be releasably locked at the lower limit of its travel and comprising an expansible packer and means actuatable responsive to a controlling pressure differential to unlock said piston from its locked position and to expand said packer upon so unlocking said piston, a venturi having a mouth and the throat and positioned in a path of fluid flowing from below to above said piston when in locked position, and means connecting said mouth and throat with said pressure responsive means to actuate the latter upon the occurrence of a predetermined pressure differential between said mouth and throat.

24. Apparatus for raising liquid in a well by gaseous pressure, comprising a free piston adapted to move up and down in a tube and to be primed at the surface of said well, said free piston having a body, a passage within said body through which fluids may be constrained to flow, an expansible seal, a spindle slidably mounted in said body and adapted to hold said seal in an unexpanded condition when said spindle is at a first extremity of its movement with respect to said body, closure means adapted to close said passage when said spindle is at the opposite extremity of its movement with respect to said body, resilient means adapted to actuate said spindle toward said opposite extremity of its movement, detent means for holding said spindle at said first extremity of its movement, an auxiliary piston reciprocably mounted in said body, means connected with said auxiliary piston for releasing said detent means, a venturi through which said liquid may be constrained to flow, means responsive to a predetermined change in the differential pressure between the input and throat of said venturi to actuate said auxiliary piston to release said detent means and free said spindle to be actuated by said resilient means to effect the release of said seal to expand and to effect the closure of said passage.

25. Apparatus for raising liquid in a well by gaseous pressure, comprising a free piston adapted to move up and down in a tube and to be primed at the surface of said well, said free piston having a body, an expansible packer, a spindle slidably mounted in said body and adapted to hold said packer in an unexpanded condition when said spindle is at the first extremity of its movement with respect to said body, detent means adapted to hold said spindle at said first extreme position, resilient means adapted to actuate said spindle toward the opposite extremity of its movement, an auxiliary piston reciprocably mounted in said body, means connected with said auxiliary piston for releasing said detent means, a venturi through which said liquid may be constrained to flow, means responsive to a predetermined change in the differential pressure between the input and throat of said venturi to actuate said auxiliary piston to release said detent means and free said spindle to be actuated by said resilient means to effect the release of said packer to expand.

26. As a subcombination, a free piston which comprises, in combination, a body member, a laterally expansible seal carried by said body member, a valve member movable with respect to said body member to close a flow passage communicating with the lower end of said body member, pressure responsive means having an operable connection with said valve member to move the same, and means including an orifice disposed to transmit fluids flowing through said passage so that flow through the orifice affords higher and lower pressures at spaced apart points adjacent said orifice, the last mentioned means also providing pressure conducting passages communicating respectively between said points and opposing effective areas of said pressure responsive means, said pressure responsive means being constructed and arranged to move said valve member upon the occurrence of a predetermined difference between said higher and lower pressures.

27. As a subcombination, a free piston which comprises, in combination, a body member, a laterally expansible seal carried by said body member, a valve member movable with respect to said body member to close a flow passage communicating with the lower end of said body member, pressure responsive means having an operable connection with said valve member to move the same and having an effective area against which pressure can be applied to cause said valve member to move to closed position, said area being exposed to said passage intermediate said valve member and said lower end of said body member.

28. In apparatus for raising liquid in a well by gaseous pressure, a liquid production tube, a discharge line connected thereto, a displacement chamber adjacent the lower end of said tube for collecting fluids from said well, conduit means connecting said chamber with the lower end of said production tube, an annular packer adapted to prevent the flow of fluids axially of said displacement chamber on the outside thereof, a gas supply main adapted to inject gas under pressure into the well on the outside of said production tube, an inlet for the admission of gas under pressure from said well outside of said production tube to said displacement chamber, valve means at said inlet adapted to open at one predetermined pressure and to close at a second predetermined pressure lower than the first, closure means in said gas supply main responsive to the arrival of liquid in said discharge line, a free piston adapted to move up and down said production tube and to be caught and primed at the surface of said well, priming means responsive to the arrival of said free piston at the surface of said well, said free piston having a body and an expansible packer, a spindle slidably mounted in said body, and adapted to hold said packer in a stretched condition when said spindle is at one extremity of its movement with respect to said body, a resilient means adapted to actuate said spindle, detent means for holding said spindle against the urging of said resilient means and thereby to hold said resilient means in primed condition, an auxiliary piston reciprocally mounted in said body, means connected with said auxiliary piston for releasing said detent means, means for permitting the displacement of well fluids from said displacement chamber into said tube and thereby permitting the build-up of a column of liquid above said free piston when said valve means at said inlet is open, a venturi through which said well fluids are constrained to flow when they are displaced from said chamber to build up in said column, means responsive to a predetermined change in the differential pressure between the input and throat of said venturi created by the well fluids flowing therethrough to actuate said auxiliary piston to release said detent means and free said spindle to be actuated by said resilient means to effect the release of said packer to expand and form a sliding seal with said tube whereby said free piston will move up said production tube.

29. Apparatus for raising liquid from a production source in a well by gaseous pressure comprising a production tube, a free piston adapted to move up and down in said production tube, a socket at the lower end of said production tube adapted to receive said free piston at the lower end of its travel, a bottom tube at the lower end of said socket, said production tube, socket, and bottom tube forming a production path within said well, packing means between said production path and the wall of said well positioned at or near said socket, and separating the upper well from the lower end of the well and the production source, and adapted to prevent vertical flow of fluids external of said production path, a passageway across said packing means, and a pressure responsive valve controlling flow through said passageway, said valve being opened and closed responsive to an increase and decrease, respectively, in pressure above the packing means.

30. In apparatus for use in raising liquid in a well by gaseous pressure, a well casing, a liquid production tube in said casing and having a discharge line connected thereto, a displacement chamber adjacent the lower end of said tube for collecting fluids from said well, conduit means connecting said chamber with the lower end of said production tube, an annular packer sealing between the chamber and casing to prevent the flow of fluids axially of said displacement chamber on the outside thereof, a gas supply main adapted to inject gas under pressure into the casing above the packer, an inlet for the admission of gas under pressure from said casing above said packer to said displacement chamber, valve means controlling flow through said inlet and opening at one predetermined casing pressure and closing at a second predetermined casing pressure lower than the first, a free piston adapted to move up and down in said production tube.

31. Apparatus as claimed in claim 30 wherein said free piston is adapted to be primed and in combination with closure means in said gas supply main responsive to the flow of liquid in said discharge line, means for catching and holding said piston at the surface of said well, priming means for priming said piston and being actuated responsive to the arrival of said free piston at the surface of said well, releasing means adapted to release said free piston after it has been primed.

32. In apparatus for raising liquid in a well by gaseous pressure, a liquid production tube, a discharge line connected thereto, a gas supply main adapted to inject gas into said well under pressure, a free piston adapted to move up and down in said liquid production tube, means for catching and holding said free piston at the surface of said well, means for priming said free piston, said means for priming being responsive to the arrival of said piston at the surface of said well, releasing means adapted to operate to drop said free piston into said well after it has been primed; said free piston having a body, an expansible packer, a passage through which fluids may be constrained to flow, a spindle slidably mounted in said body and adapted to hold said packer in an unexpanded condition when said spindle is at a first extremity of its movement with respect to said body, closure means adapted to close said passage when said spindle is at the opposite extremity of its movement with respect to said body, resilient means adapted to actuate said spindle toward said opposite extremity of its movement, detent means for holding said spindle at said first extremity of its movement, an auxiliary piston reciprocally mounted in said body, means connected with said auxiliary piston for releasing said detent means, a venturi through which said liquid may be constrained to flow, means responsive to a predetermined change in a differential pressure created by the liquid flowing through said venturi to actuate said auxiliary piston to release said detent means and free said spindle to be actuated by said resilient means to effect the release of said packer to expand and to effect the closure of said passage.

33. In apparatus for raising liquid in a well by gaseous pressure including a production tube, a free piston adapted to move up and down in said production tube, said free piston being adapted to be primed to permit flow of fluids from below to above said free piston, and being further adapted to be released from said primed condition when a predetermined slug of liquid is above said free piston and thereby to become a substantially impermeable plug in said tube, the combination of means for catching and holding said free piston at the top of its up stroke, means for priming said piston, means responsive to the arrival of said free piston at said top of its up stroke to energize said priming means, means for releasing said catching and holding means after said piston has been primed, and means for controlling the pressure exerted on liquid at the bottom of the well external of said production tube, and means for causing the pressure exerted on said liquid internal of said production tube to become less than the pressure exerted on said liquid external of said tube.

34. In apparatus for raising liquid in a well by gaseous pressure including a production tube, a free piston adapted to move up and down in said production tube, said free piston being adapted to be primed to permit flow of fluids from below to above said free piston, and being further adapted to be released from said primed condition when a predetermined slug of liquid is above said free piston and thereby to become a substantially impermeable plug in said tube, the combination of a discharge line connected to said production tube, a valve in said discharge line, means for opening said valve at a predetermined time and for closing said valve in response to the arrival of said free piston at the top of said production tube, means for catching said free piston when it arrives at the top of said production tube, means responsive to the arrival of said free piston at said top for priming said free piston, and means for dropping said free piston from its position at the top of said production tube after said free piston has been primed.

35. In apparatus for raising liquid in a well by a gaseous pressure including a production tube, a free piston adapted to move up and down in said production tube, said free piston being adapted to be primed to permit flow of fluids from below to above said free piston, and being further adapted to be released from said primed condition when a predetermined slug of liquid is above said free piston and thereby to become a substantially impermeable plug in said tube, the combination of a gas supply line adapted to supply gas under pressure to said well external of said production tube at a predetermined time, means responsive to the flow of liquid at the top of said production tube to close said gas supply line, means for catching and holding said free piston at the top of said production tube, means responsive to the arrival of said free piston at the top of said production tube for priming said free piston, means for releasing said catching and holding means, and means responsive to said priming means to actuate said releasing means to drop said free piston from its position at the top of said production tube after said free piston has been primed.

36. A free piston adapted to move up and down in a tube comprising means defining a pressure chamber including a reciprocating member normally urged outward by fluid pressure within said chamber and normally urged inward by fluid pressure in said tube and outside of said pressure chamber, resilient means for urging said reciprocating member outward, an expansible packer adapted to be expanded, and means connecting said packer and reciprocating member whereby said packer is expanded responsive to inward movement of said reciprocating member and retracted responsive to outward movement of said reciprocating member.

37. The apparatus defined in claim 36 in combination with means including a check valve for fluid to escape from said pressure chamber whenever the pressure inside said chamber exceeds the pressure outside said chamber.

38. The apparatus defined in claim 36 wherein there is provided a fluid passage inside said packer, a valve member for closing said passage and a force transmitting connection between said valve and reciprocating members to move said valve member to open position when said reciprocating member moves outward.

39. Apparatus for raising liquid in a tube by gaseous pressure comprising a cylinder closed at one end, a piston slidably mounted within said cylinder and adapted to move inward and outward inside said cylinder, said cylinder and said piston defining a pressure chamber normally at atmospheric pressure resilient means normally urging said piston outward, an expansible packer adapted to be expanded when said piston is inward and retracted when said piston is outward and a check valve opening from said pressure chamber whereby the fluid pressure within said pressure chamber will equalize with any lower pressure outside said pressure chamber, said check valve being so positioned that liquid will flow out said valve before gas.

References Cited in the file of this patent

UNITED STATES PATENTS

| | | |
|---|---|---|
| 1,748,361 | Mingus et al. | Feb. 25, 1930 |
| 1,819,994 | Claytor | Aug. 18, 1931 |
| 1,836,875 | Ricker | Dec. 15, 1931 |
| 1,932,452 | Evans | Oct. 31, 1933 |
| 1,932,992 | Sherman et al. | Oct. 31, 1933 |
| 1,993,292 | Woods | Mar. 5, 1935 |
| 2,017,353 | Parks | Oct. 15, 1935 |
| 2,064,272 | Scott | Dec. 15, 1936 |
| 2,347,472 | Dorward | Apr. 25, 1944 |
| 2,555,112 | Brown | May 29, 1951 |

Notice of Adverse Decision in Interference

In Interference No. 87,947, involving Patent No. 2,714,855, N. F. Brown, Apparatus for gas lift of liquid in wells, final judgment adverse to the patentee was rendered May 20, 1957, as to claims 27, 36, and 38.

[*Official Gazette June 25, 1957.*]